(12) United States Patent
Shimomura et al.

(10) Patent No.: US 8,767,313 B2
(45) Date of Patent: Jul. 1, 2014

(54) ZOOM LENS AND IMAGE PICKUP APPARATUS INCLUDING THE SAME

(75) Inventors: Kazuya Shimomura, Utsunomiya (JP); Fumiaki Usui, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/479,394

(22) Filed: May 24, 2012

(65) Prior Publication Data
US 2012/0300118 A1 Nov. 29, 2012

(30) Foreign Application Priority Data
May 24, 2011 (JP) .................................. 2011-115344

(51) Int. Cl.
*G02B 15/14* (2006.01)
*G02B 15/22* (2006.01)

(52) U.S. Cl.
CPC ..................................... *G02B 15/22* (2013.01)
USPC ........................................................... 359/687

(58) Field of Classification Search
USPC .......................... 359/686–688, 705, 683, 680
See application file for complete search history.

(56) References Cited

U.S. PATENT DOCUMENTS 5,760,967 A * 6/1998 Terasawa et al. ............. 359/684

FOREIGN PATENT DOCUMENTS

| EP | 1 887 401 A1 | 2/2008 |
|---|---|---|
| EP | 1 965 240 A1 | 9/2008 |
| JP | 9-258102 A | 3/1997 |
| JP | 3-301579 B2 | 7/2002 |
| JP | 3-495772 B2 | 2/2004 |

OTHER PUBLICATIONS

Extended European Search Report issued in counterpart European Patent Application No. 12003923.5 dated Jun. 13, 2013.

* cited by examiner

*Primary Examiner* — Scott J Sugarman
*Assistant Examiner* — Robert E Tallman
(74) *Attorney, Agent, or Firm* — Rossi, Kimms & McDowell, LLP

(57) ABSTRACT

A zoom lens including, in order from object side: a positive first unit fixed for zooming; a negative second unit moving for zooming; a zoom unit including at least one unit moving for zooming; a stop; and a fixed unit. The first unit includes a negative first sub-unit not moving for focusing, and a positive second sub-unit and a positive third sub-unit moving toward image side and object side, respectively, when focusing from infinity object to proximity object. A focal lengths of the first and second units, a distance from a vertex of a surface closest to the image side in the first unit to an image side principal point position of the first unit, a thickness of the first unit on an optical axis, and lateral magnifications of the second and third sub-units when focusing on infinity object are appropriately set.

9 Claims, 14 Drawing Sheets

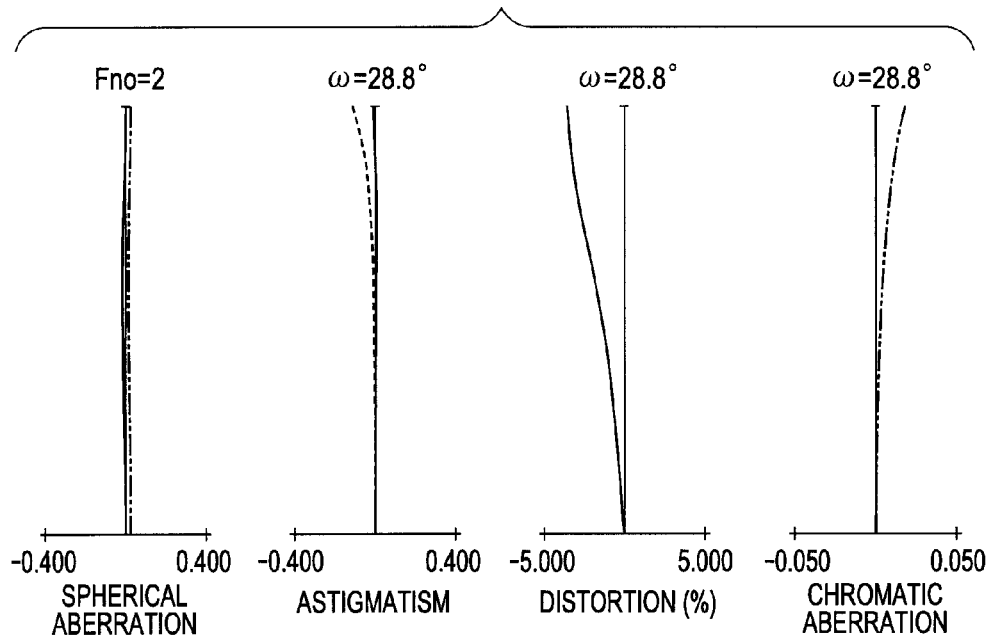
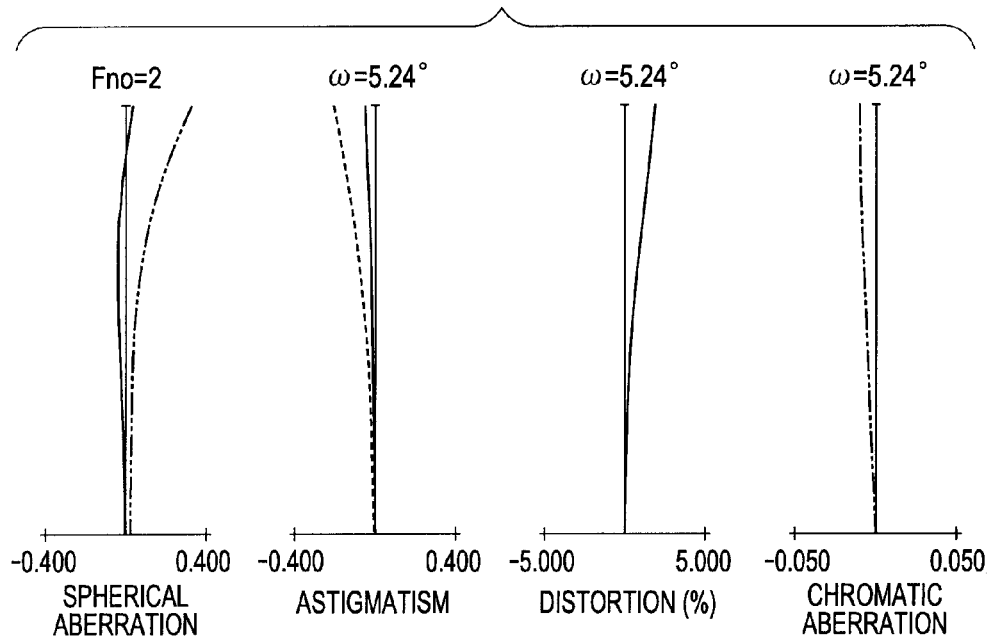

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and more particularly, to a zoom lens suited for use in a broadcasting camera, a video camera, a digital still camera, and a silver-halide film camera.

2. Description of the Related Art

In recent years, a zoom lens with a large aperture diameter ratio, a high zoom ratio, and a high optical performance is desired for use in an image pickup apparatus, such as a television camera, a silver-halide film camera, a digital still camera, or a video camera. A positive lead type four-unit zoom lens has been known as the zoom lens with a large aperture diameter ratio and a high zoom ratio. In the four-unit zoom lens, four lens units are provided in total, and one of the lens units located closest to an object side has positive refractive power. It is known that the four-unit zoom lens includes a first lens unit for focusing, a second lens unit having negative refractive power for varying magnification, a third lens unit for correcting an image plane variation due to the varying magnification, and a fourth lens unit having positive refractive power for imaging, which are arranged in the stated order from the object side to the image side.

For instance, Japanese Patent No. 3495772 discloses a zoom lens in which a first lens unit includes a first sub lens unit having negative refractive power, a second sub lens unit having positive refractive power, and a third sub lens unit having positive refractive power, and both the second sub lens unit and the third sub lens unit move to the object side when focusing from an object at infinity to an object at close range.

Further, Japanese Patent No. 3301579 discloses a zoom lens in which a first lens unit includes a first sub lens unit having negative refractive power, a second sub lens unit having positive refractive power, and a third sub lens unit having positive refractive power, and the second sub lens unit and the third sub lens unit move to the image side and the object side, respectively, when focusing from an object at infinity to an object at close range.

In broadcasting of sports events or photography for a nature program, shooting subjects are usually performed from a distance, and hence it is preferred to use a telephoto zoom lens having a high zoom ratio and a long focal length at a telephoto end. On the contrary, along with a higher pixel density of an image pickup element, the telephoto zoom lens is required to have high performance. Particularly, high optical performance is required in the entire zoom region and in the entire focus region. In order to achieve high optical performance in the entire zoom region and in the entire focus region of the above-mentioned positive lead type four-unit zoom lens, it is necessary to appropriately set refractive powers and lens configurations of the lens units. In particular, it is necessary to appropriately set power arrangement and lens configuration in the first lens unit. If the power arrangement and the lens configuration of the first lens unit are not optimized, a fluctuation of spherical aberration or coma aberration increases near a minimum object distance on a telephoto end side, and hence it becomes difficult to achieve higher performance in the entire focus region. In addition, if the number of lenses in the first lens unit is increased so as to increase flexibility on aberration correction for achieving higher performance, the first lens unit becomes thicker and larger.

SUMMARY OF THE INVENTION

Therefore, the present invention provides a smaller zoom lens having high optical performance in the entire zoom region and in the entire focus region by appropriately setting power arrangement and lens configuration of a first lens unit so that fluctuations of various aberrations due to zooming and focusing are reduced.

A zoom lens according to the present invention includes, in order from an object side: a first lens unit having positive refractive power which does not move for varying magnification; a second lens unit having negative refractive power which moves during varying magnification; a magnification-varying lens unit including at least one lens unit which moves during varying magnification; a stop; and a fixed lens unit which is fixed for varying magnification, in which the first lens unit includes a first sub lens unit having negative refractive power which does not move for focusing, a second sub lens unit having positive refractive power which moves toward an image side when focusing from an object at infinity to an object at close range, and a third sub lens unit having positive refractive power which moves toward the object side when focusing from an object at infinity to an object at close range, and the following expressions are satisfied:

$$-15.0 < f1/f2 < -2.0,$$

$$-0.25 < Ok/D < 0.15, \text{ and}$$

$$|\beta13/\beta12| < 0.1,$$

where f1 represents a focal length of the first lens unit, f2 represents a focal length of the second lens unit, Ok represents a distance from a vertex of a surface closest to the image side in the first lens unit to an image side principal point position of the first lens unit in a state in which an object at infinity is focused, D represents a thickness of the first lens unit on an optical axis in the state in which an object at infinity is focused, and $\beta12$ and $\beta13$ represent lateral magnifications of the second sub lens unit and the third sub lens unit, respectively, in the state in which an object at infinity is focused.

It is possible to obtain a smaller zoom lens having high optical performance in the entire zoom region and in the entire focus region by reducing fluctuations of various aberrations due to zooming and focusing.

Further features of the present invention will become apparent from the following description of exemplary embodiments with reference to the attached drawings.

BRIEF DESCRIPTION OF THE DRAWINGS

FIG. 2A is a longitudinal aberration graph of the zoom lens according to Numerical Embodiment 1 at the wide-angle end.

FIG. 2B is a longitudinal aberration graph of the zoom lens according to Numerical Embodiment 1 at a focal length of 60 mm.

DESCRIPTION OF THE EMBODIMENTS

Hereinafter, exemplary embodiments of the present invention are described in detail with reference to the attached drawings.

First, features of a zoom lens according to the present invention are described along with expressions.

The zoom lens of the present invention includes, in order from an object side, a first lens unit having positive refractive power which does not move for varying magnification, a second lens unit having negative refractive power which moves during varying magnification, a magnification-varying lens unit having at least one lens unit which moves during varying magnification, a stop, and a fixed lens unit which does not move for varying magnification. The first lens unit includes a first sub lens unit having negative refractive power which does not move for focusing, a second sub lens unit having positive refractive power which moves toward an image side when focusing from an object at infinity to an object at close range, and a third sub lens unit having positive refractive power which moves toward an object side when focusing from an object at infinity to an object at close range.

In order to achieve high optical performance in the entire focus region and a smaller size of the first lens unit, the zoom lens of the present invention defines a configuration of the first lens unit, a ratio of a focal length of the first lens unit to a focal length of the second lens unit, lateral magnifications of the second sub lens unit and the third sub lens unit constituting the first lens unit. The following expressions are satisfied:

$$-15.0 < f1/f2 < -2.0 \quad (1)$$

$$-0.25 < Ok/D < 0.15 \quad (2)$$

$$|\beta 13/\beta 12| < 0.1 \quad (3)$$

where f1 represents the focal length of the first lens unit, f2 represents the focal length of the second lens unit, Ok represents a distance from a vertex of a surface closest to the image side in the first lens unit to an image side principal point position (rear principal point) of the first lens unit in a state in which an object at infinity is focused, D represents a thickness of the first lens unit on an optical axis in the state in which an object at infinity is focused, and β12 and β13 respectively represent the lateral magnifications of the second sub lens unit and the third sub lens unit in the state in which an object at infinity is focused.

An optical action when a focusing method described above is adopted in the present invention is described below.

In general, in a telephoto zoom lens having a long focal length at a telephoto end, an inner focus system is adopted, in which the first lens unit includes a first sub lens unit which is fixed for focusing and a second sub lens unit which moves toward the object side when focusing from an object at infinity to an object at close range.

Figure 18A:
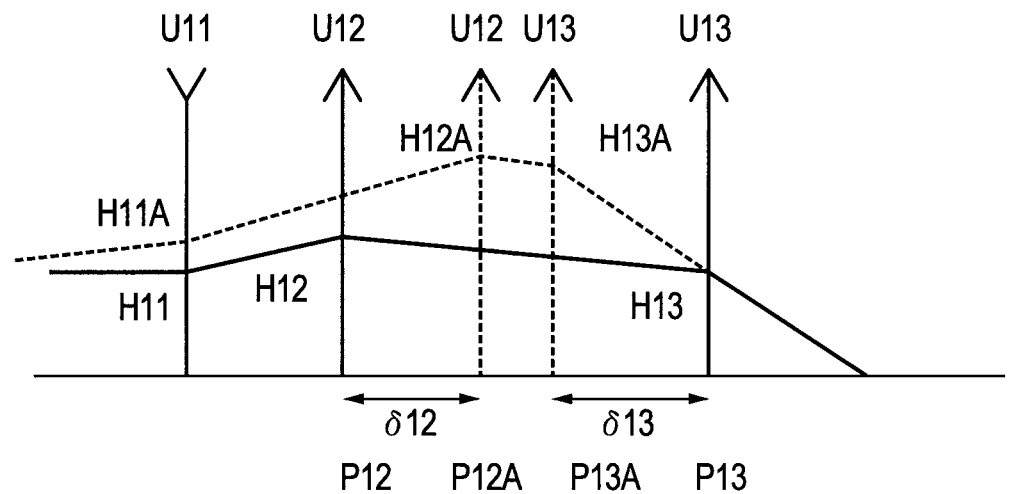
FIG. 18A is a conceptional diagram illustrating an arrangement of lens units in a first lens unit.
Figure 18B:
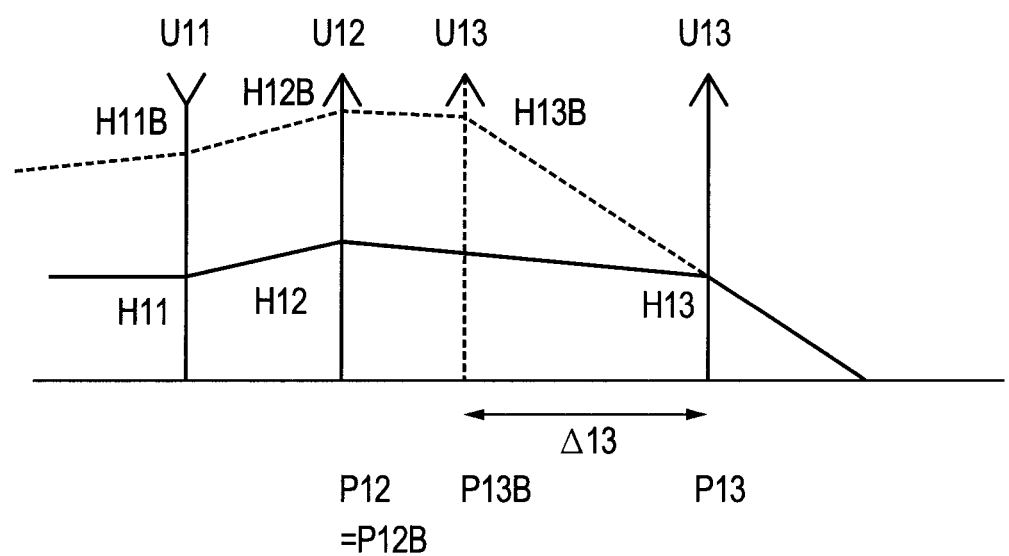
FIG. 18B is a conceptional diagram illustrating an arrangement of the lens units in the first lens unit.

Next, a case is discussed in which a first lens unit U1 includes a first sub lens unit U11 having negative refractive power, a second sub lens unit U12 having positive refractive power, and a third sub lens unit U13 having positive refractive power, as in the present invention. An axial paraxial beam from an object at infinity is indicated by a solid line, and in this case, positions of the second sub lens unit and the third sub lens unit on the optical axis are represented by P12 and P13, respectively, and incident heights of the axial paraxial beam in the first sub lens unit, the second sub lens unit, and the third sub lens unit are represented by H11, H12, and H13, respectively. Here, a comparison is made between a case (type A) in which the second sub lens unit is moved toward the image side while the third sub lens unit is moved toward the object side for focusing from an infinity side to a close range side as illustrated in FIG. 18A and a case (type B) of the above-mentioned inner focus system in which only the third sub lens unit is moved toward the object side for focusing from the infinity side to the close range side as illustrated in FIG. 18B. In FIG. 18A, the axial paraxial beam from a predetermined finite distance object is indicated by a dotted line, and in this case, positions of the second sub lens unit and the third sub lens unit on the optical axis are represented by P12A and P13A, respectively, and incident heights of the axial paraxial beam in the first sub lens unit, the second sub lens unit, and the third sub lens unit are represented by H11A, H12A, and H13A, respectively. On the other hand, in FIG. 18B, the axial paraxial beam from a predetermined finite distance object is indicated by a dotted line, and in this case, positions of the second sub lens unit and the third sub lens unit on the optical axis are represented by P12B and P13B, respectively, and incident heights of the axial paraxial beam in the first sub lens unit, the second sub lens unit, and the third sub lens unit are represented by H11B, H12B, and H13B, respectively.

Here, the following relationship is satisfied:

$$\Delta 13 > \delta 13 \quad (12)$$

$$\Delta 13 < \delta 12 + \delta 13 \quad (13)$$

where $\delta 12 = P12A - P12$, $\delta 13 = P13 - P13A$, and $\Delta 13 = P13 - P13B$ are defined.

In other words, when the type A is adopted, the sum of movement amounts of the second sub lens unit and the third sub lens unit for focusing becomes larger than that in the type B, but a movement amount of the third sub lens unit can be made small. As a result, comparing the type A with the type B in a predetermined finite distance object, the second sub lens unit and the third sub lens unit are disposed closer to the image side in the type A. As a result, relationships among the above-mentioned incident heights of the axial paraxial beam are as follows.

$$H11 < H11A < H11B \quad (14)$$

$$H12 < H12A < H12B \quad (15)$$

$$H13 < H13A < H13B \quad (16)$$

In other words, compared with the type B, the type A has smaller variations in incident height of the paraxial beam of the first sub lens unit, the second sub lens unit, and the third sub lens unit due to focusing. According to the third-order aberration theory, for example, a primary aberration coefficient L of an axial chromatic aberration is proportional to the square of a paraxial beam height H, and a third-order aberration coefficient I of a spherical aberration is proportional to the fourth power of the paraxial beam height H. Therefore, compared with the type B, the type A has smaller aberration fluctuations of the first sub lens unit, the second sub lens unit, and the third sub lens unit from an object at infinity to an object at a minimum object distance, and hence the aberration fluctuation of the first lens unit due to focusing can be suppressed. Further, through appropriate setting of configurations and movement amounts of the lens units, aberration fluctuations due to the first sub lens unit, the second sub lens unit, and the third sub lens unit for focusing can be canceled with each other, and hence the aberration fluctuation of an object at the minimum object distance can be appropriately corrected.

The variation of an axial beam due to focusing is described above, but the same relationships described above are satisfied in a variation of an off-axis beam due to focusing, too. Thus, variations of the off-axis beam of the first sub lens unit, the second sub lens unit, and the third sub lens unit due to focusing are smaller in the type A. In the present invention, a spherical aberration, a coma aberration, and a chromatic aberration are appropriately corrected particularly on the telephoto end side close to the minimum object distance, by using the variation of aberration due to movements of the second sub lens unit and the third sub lens unit.

Next, the above-mentioned expressions (1) to (3) are described.

The expression (1) defines a ratio between the focal length of the first lens unit and the focal length of the second lens unit.

$$-15.0 < f1/f2 < -2.0 \quad (1)$$

When the expression (1) is satisfied, both a smaller size of the zoom lens and correction of aberration fluctuation are achieved. If the condition of the upper limit of the expression (1) is not satisfied, power of the first lens unit becomes strong so that it becomes difficult to correct fluctuations of various aberrations due to focusing (hereinafter referred to as focus fluctuations). On the contrary, if the condition of the lower limit of the expression (1) is not satisfied, power of the first lens unit becomes weak so that it becomes difficult to downsize the zoom lens. It is more preferred to set the expression (1) as follows.

$$-9.0 < f1/f2 < -2.2 \tag{1a}$$

In addition, the expression (2) defines a ratio of the image side principal point position of the first lens unit to the thickness of the first lens unit on the optical axis in the state in which an object at infinity is focused.

$$-0.25 < Ok/D < 0.15 \tag{2}$$

When the expression (2) is satisfied, an image side principal point of the first lens unit can be set at an appropriate position so that reduction of a movement amount of the magnification-varying lens unit for zooming and downsizing of the first lens unit are achieved. If the condition of the upper limit of the expression (2) is not satisfied, the image side principal point position of the first lens unit shifts to the image side so that an object point of the second lens unit (an image point of the first lens unit) moves away from the second lens unit. Therefore, a movement amount of the second lens unit for zooming becomes large so that it becomes difficult to downsize the zoom lens. On the contrary, if the condition of the lower limit of the expression (2) is not satisfied, the image side principal point position of the first lens unit becomes the object side so that a size of the first lens unit, particularly the first sub lens unit is increased. It is more preferred to set the expression (2) as follows.

$$-0.16 < Ok/D < 0.07 \tag{2a}$$

Further, the expression (3) defines a ratio between the lateral magnifications of the second sub lens unit and the third sub lens unit in the state in which an object at infinity is focused.

$$|\beta 13/\beta 12| < 0.1 \tag{3}$$

When the expression (3) is satisfied, the zoom lens can be downsized while correcting the focus fluctuation. If the upper limit of the expression (3) is exceeded, power of the first sub lens unit becomes stronger than power of the second sub lens unit. Therefore, the image side principal point position of the first lens unit shifts to the image side, and it becomes difficult to downsize the zoom lens because of the above-mentioned reason. It is more preferred to set the expression (3) as follows.

$$|\beta 13/\beta 12| < 0.08 \tag{3a}$$

As another feature of the zoom lens of the present invention, a ratio of a focal length of the first sub lens unit to the focal length of the first lens unit is defined in order to reduce a movement amount of the second sub lens unit when focusing from an object at infinity to an object at the minimum object distance while correcting the focus fluctuation. The following expression is satisfied:

$$1.5 < |f11/f1| < 5.0 \tag{4}$$

where f11 represents the focal length of the first sub lens unit. If the condition of the upper limit of the expression (4) is not satisfied, power of the first sub lens unit becomes weak. Therefore, the movement amount of the second sub lens unit is increased for correcting the focus fluctuation so that it becomes difficult to downsize the zoom lens. On the contrary, if the condition of the lower limit of the expression (4) is not satisfied, power of the first sub lens unit becomes strong so that refractive power of a lens constituting the first sub lens unit becomes strong. As a result, a high-order aberration occurs due to focusing so that aberration correction becomes difficult. It is more preferred to set the expression (4) as follows.

$$1.53 < |f11/f1| < 3.80 \tag{4a}$$

As still another feature of the zoom lens of the present invention, a relationship between the movement amount of the second sub lens unit for focusing to the movement amount of the third sub lens unit for focusing is defined in order to reduce the movement amounts of the second sub lens unit and the third sub lens unit when focusing from an object at infinity to an object at the minimum object distance while correcting the focus fluctuation. The following expression is satisfied:

$$0.5 < |\delta 12/\delta 13| < 2.5 \tag{5}$$

where $\delta 12$ and $\delta 13$ respectively represent the movement amounts of the second sub lens unit and the third sub lens unit when focusing from an object at infinity to an object at the minimum object distance. If the condition of the upper limit of the expression (5) is not satisfied, the movement amount of the second sub lens unit for focusing becomes large, and hence it becomes difficult to downsize the zoom lens. On the contrary, if the condition of the lower limit of the expression (5) is not satisfied, the movement amount of the second sub lens unit for focusing becomes small. Therefore, the movement amount of the third sub lens unit becomes large, and hence it becomes difficult to correct the focus fluctuation. It is more preferred to set the expression (5) as follows.

$$0.65 < |\delta 12/\delta 13| < 2.20 \tag{5a}$$

As yet another feature of the zoom lens of the present invention, a ratio of a focal length of the second sub lens unit to the focal length of the first lens unit and a ratio of a focal length of the third sub lens unit to the focal length of the first lens unit are defined in order to downsize the first lens unit while correcting the focus fluctuation. The following expressions are satisfied:

$$1.0 < f12/f1 < 4.0 \tag{6}$$

$$0.8 < f13/f1 < 1.3 \tag{7}$$

where f12 represents the focal length of the second sub lens unit, and f13 represents the focal length of the third sub lens unit. If the condition of the upper limit of the expression (6) is not satisfied, power of the second sub lens unit becomes weak so that the movement amount of the second sub lens unit for focusing becomes large. On the contrary, if the condition of the lower limit of the expression (6) is not satisfied, power of the second sub lens unit becomes strong. Therefore, a high-order aberration occurs due to focusing, and hence aberration correction becomes difficult. In addition, if the number of lenses of the second sub lens unit is increased for correcting the focus fluctuation, the mass of the second sub lens unit becomes large so that trackability for focusing is decreased, and a size of a drive mechanism is increased.

In addition, if the condition of the upper limit of the expression (7) is not satisfied, power of the third sub lens unit becomes weak. Therefore, the movement amount of the third sub lens unit for focusing becomes large, and hence it becomes difficult to downsize the first lens unit. On the contrary, if the condition of the lower limit of the expression (7) is not satisfied, power of the third sub lens unit becomes strong. Therefore, a high-order aberration occurs, and hence it becomes difficult to correct the remaining aberration. It is more preferred to set the expressions (6) and (7) as follows.

$$1.2 < f12/f1 < 3.5 \quad (6a)$$

$$0.9 < f13/f1 < 1.15 \quad (7a)$$

As yet another feature of the zoom lens of the present invention, a lens configuration of the first sub lens unit is defined in order to set the image side principal point of the first lens unit to an appropriate position. The first sub lens unit includes one or more concave lenses and one convex lens. There are disposed a concave lens 11n and a convex lens 11p in order from the object side.

As yet another feature of the zoom lens of the present invention, a shape of the concave lens closest to the object side constituting the first sub lens unit is defined in order to appropriately correct an aberration in the entire zoom region. The following expression is satisfied:

$$|(R11+R12)/(R11-R12)| < 1.0 \quad (8)$$

where R11 represents a curvature radius of the object-side surface of the concave lens 11n which is disposed closest to the object side, and R12 represents a curvature radius of the image-side surface of the concave lens 11n. If the condition of the upper limit of the expression (8) is not satisfied, the curvature radius of the object-side surface of the concave lens 11n becomes large, and hence it becomes difficult to correct a pincushion distortion particularly in an intermediate position of zooming. It is more preferred to set the expression (8) as follows.

$$0.10 < |(R11+R12)/(R11-R12)| < 0.85 \quad (8a)$$

As yet another feature of the zoom lens of the present invention, a lens configuration and a glass material of the second sub lens unit are defined in order to correct the focus fluctuation. The second sub lens unit includes two or more convex lenses and one or more concave lenses, and the following expressions are satisfied:

$$0.15 < N12n - N12p < 0.60 \quad (9)$$

$$30 < v12p - v12n < 70 \quad (10)$$

where N12p and v12p respectively represent an average refractive index and an average Abbe number of the convex lenses constituting the second sub lens unit, and N12n and v12n respectively represent an average refractive index and an average Abbe number of the concave lenses. If the condition of the upper limit of the expression (9) is not satisfied, a glass material having a large anomalous dispersion is to be used for the concave lens constituting the second sub lens unit, and hence it becomes difficult to correct a secondary spectrum of the chromatic aberration. On the contrary, if the condition of the lower limit of the expression (9) is not satisfied, a refractive index difference between the convex lens and the concave lens for correcting the aberration fluctuation becomes small, and hence it becomes difficult to correct the focus fluctuation. In addition, if the condition of the upper limit of the expression (10) is not satisfied, a glass material having a large anomalous dispersion is to be used for the concave lens constituting the second sub lens unit, and hence it becomes difficult to correct the secondary spectrum of the chromatic aberration. On the contrary, if the lower limit of the expression (10) is exceeded, refractive powers of the convex lens and the concave lens constituting the second sub lens unit become strong. Therefore, a high-order aberration occurs, and hence it becomes difficult to correct the remaining aberration. It is more preferred to set the expressions (9) and (10) as follows.

$$0.23 < N12n - N12p < 0.50 \quad (9a)$$

$$43 < v12p - v12n < 58 \quad (10a)$$

As yet another feature of the zoom lens of the present invention, it is defined that an image pickup apparatus of the present invention includes the zoom lens of each example and a solid-state image pickup element having a predetermined effective photographing range for receiving an image formed by the zoom lens. Further, in order to downsize the image pickup apparatus of the present invention and to correct the focus fluctuation, a relationship between the focal length of the third sub lens unit and the movement amount of the third sub lens unit when focusing from an object at infinity to an object at the minimum object distance is defined. The following expression is satisfied:

$$0.16 < |\delta13 \times f1/f13/IS| < 1.80 \quad (11)$$

where IS represents an image size of the image pickup apparatus. If the condition of the upper limit of the expression (11) is not satisfied, the movement amount of the third sub lens unit for focusing becomes large, and hence it becomes difficult to correct the aberration fluctuation due to the movement of the third sub lens unit. On the contrary, if the lower limit of the expression (11) is exceeded, the movement amount of the third sub lens unit having a large contribution to focusing becomes small. Therefore, the movement amount of the second sub lens unit increases, and hence it becomes difficult to downsize the first lens unit. It is more preferred to set the expression (11) as follows.

$$0.20 < |\delta13 \times f1/f13/IS| < 1.20 \quad (11a)$$

Hereinafter, lens configurations of Embodiments 1 to 4 as specific configurations of the zoom lens of the present invention are described with reference to corresponding Numerical Embodiments 1 to 4.

Embodiment 1

Figure 1A:
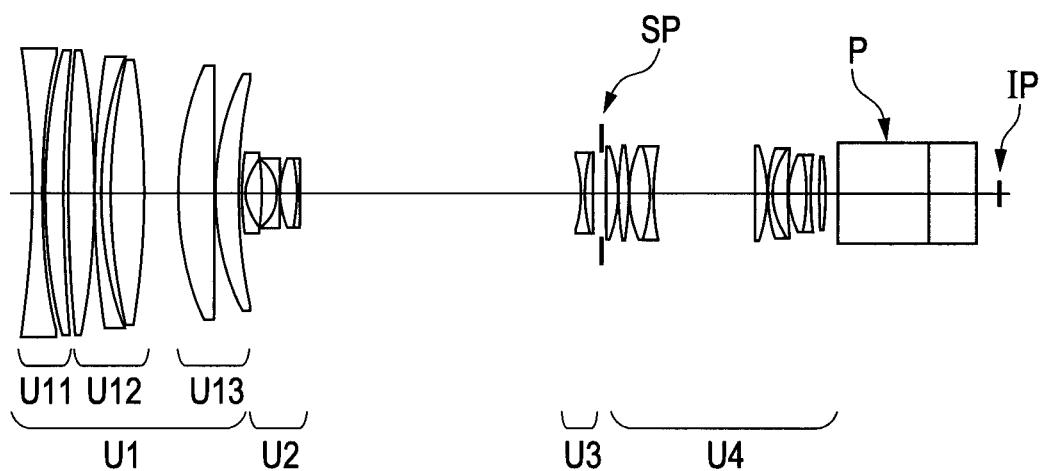
FIG. 1A is a lens cross-sectional view of a zoom lens according to Numerical Embodiment 1 of the present invention at a wide-angle end when focusing at infinity.
Figure 1B:
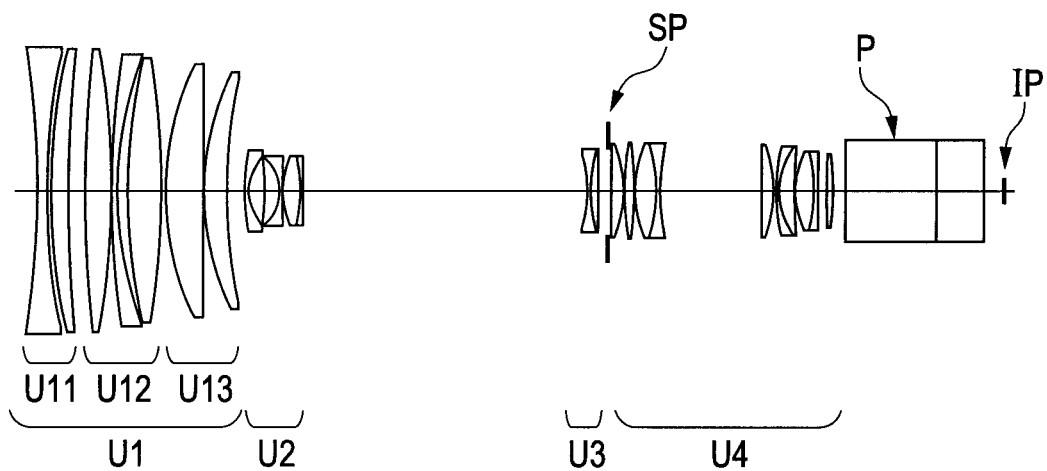
FIG. 1B is a lens cross-sectional view of the zoom lens according to Numerical Embodiment 1 at the wide-angle end when focusing at a minimum object distance.
Figure 3A:
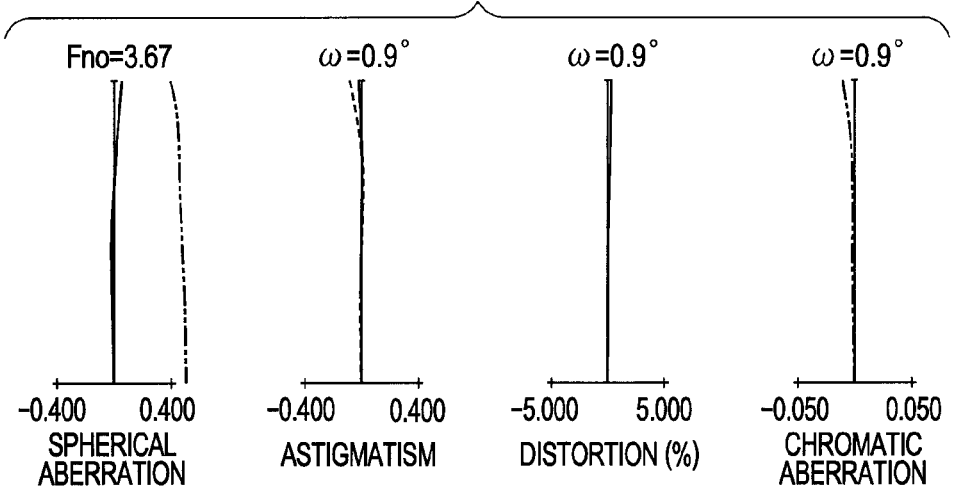
FIG. 3A is a longitudinal aberration graph of the zoom lens according to Numerical Embodiment 1 at a telephoto end when focusing at infinity.
Figure 3B:
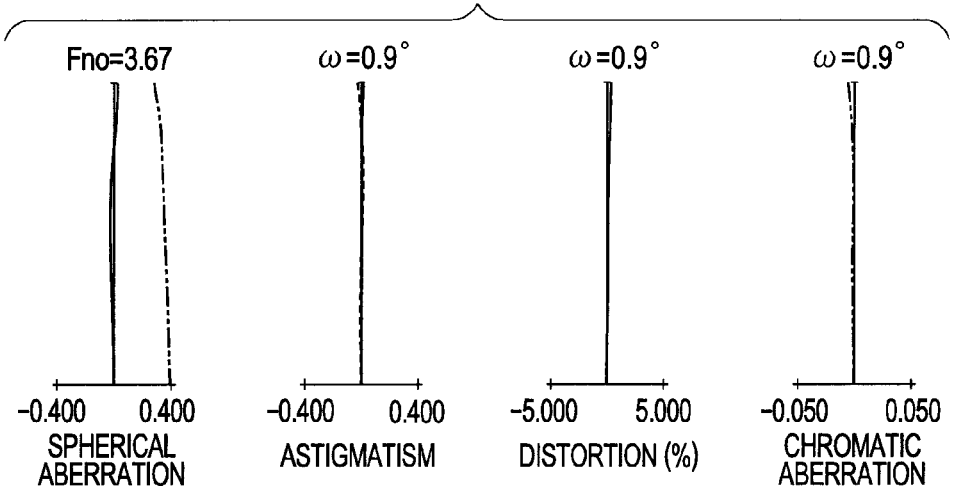
FIG. 3B is a longitudinal aberration graph of the zoom lens according to Numerical Embodiment 1 at the telephoto end when focusing at an object distance of 7 m.
Figure 3C:
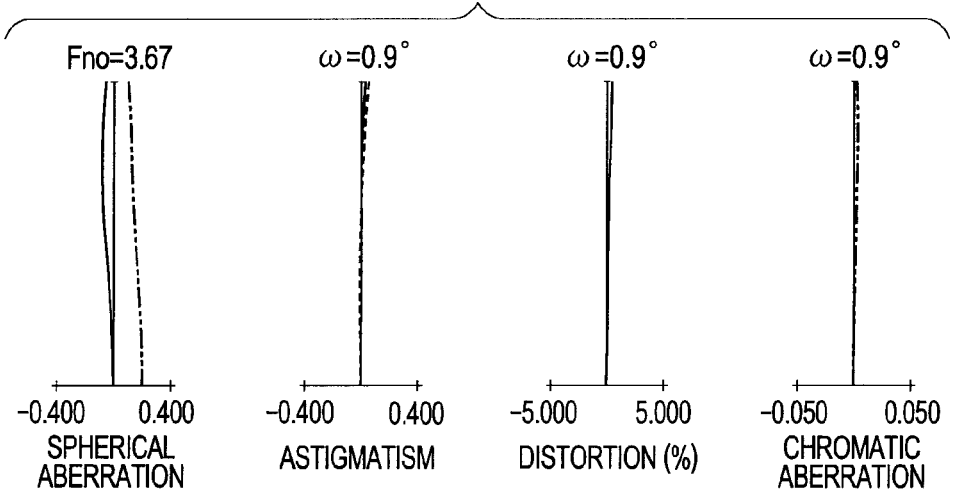
FIG. 3C is a longitudinal aberration graph of the zoom lens according to Numerical Embodiment 1 at the telephoto end when focusing at the minimum object distance.
Figure 4A:
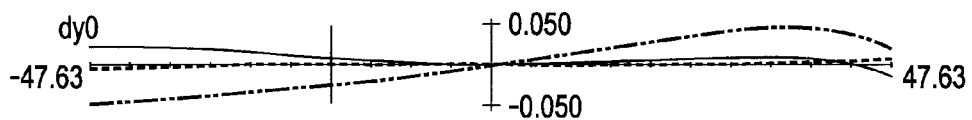
FIG. 4A is a lateral aberration graph of the zoom lens according to Numerical Embodiment 1 at the telephoto end with an image height of 4 mm when focusing at infinity.
Figure 4B:
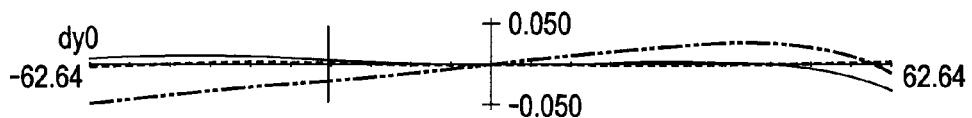
FIG. 4B is a lateral aberration graph of the zoom lens according to Numerical Embodiment 1 at the telephoto end with an image height of 4 mm when focusing at an object distance of 7 m.
Figure 4C:
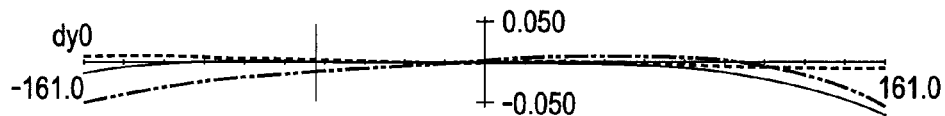
FIG. 4C is a lateral aberration graph of the zoom lens according to Numerical Embodiment 1 at the telephoto end with an image height of 4 mm when focusing at the minimum object distance.

In a zoom lens according to Embodiment 1 (Numerical Embodiment 1) of the present invention, a lens cross-sectional view at a wide-angle end when focusing on an object at infinity is illustrated in FIG. 1A, and a lens cross-sectional view at the wide-angle end when focusing on an object at the minimum object distance (2.5 m) is illustrated in FIG. 1B. A longitudinal aberration graph of Numerical Embodiment 1 at the wide-angle end when focusing on an object at infinity is illustrated in FIG. 2A. A longitudinal aberration graph of Numerical Embodiment 1 at a focal length of 60 mm when focusing on an object at infinity is illustrated in FIG. 2B. FIGS. 3A to 3C illustrate longitudinal aberration graphs of Numerical Embodiment 1 at a telephoto end. The longitudinal aberration graph when focusing on an object at infinity is illustrated in FIG. 3A. The longitudinal aberration graph when focusing at an object distance of 7 m is illustrated in FIG. 3B. The longitudinal aberration graph when focusing on an object at the minimum object distance is illustrated in FIG. 3C. FIGS. 4A to 4C illustrate lateral aberration graphs of Numerical Embodiment 1 at the telephoto end with an image height of 4 mm. The lateral aberration graph when focusing on an object at infinity is illustrated in FIG. 4A. The lateral aberration graph when focusing at an object distance of 7 m is illustrated in FIG. 4B. The lateral aberration graph when focusing on an object at the minimum object distance is illustrated in FIG. 4C. Note that, the value of the focal length is a value of Numerical Embodiment described later expressed in millimeters. The same applies to all the following Numerical Embodiments.

As shown in FIGS. 1A and 1B, the zoom lens includes, in order from the object side: a first lens unit (focus lens unit) U1 for focusing having positive refractive power (which does not move for varying magnification); a second lens unit (variator) U2 for varying magnification having negative refractive power which moves toward the image side when varying magnification from the wide-angle end to the telephoto end; a third lens unit (compensator) U3 having negative refractive power which moves non-linearly on the optical axis in association with a movement of the second lens unit U2 so as to correct an image plane variation due to magnification-varying (as a magnification-varying lens unit which moves during varying magnification); and a fourth lens unit (relay lens unit) U4 having positive refractive power which does not move for varying magnification and has an image forming action (as a fixed lens unit).

The second lens unit U2 and the third lens unit U3 constitute a magnification-varying system. An aperture stop SP is disposed on the object side of the fourth lens unit U4. A color separating optical system or an optical filter P is illustrated as a glass block. An image plane IP corresponds to an image pickup plane of the solid-state image pickup element.

In each longitudinal aberration graph, a spherical aberration is illustrated with respect to an e-line (indicated with a solid line) and a g-line (indicated with a chain double-dashed line). Further, astigmatism is illustrated for that in a meridional image plane (meri) (indicated with a dotted line) with respect to the e-line and for that in a sagittal image plane (Sagi) (indicated with a solid line) with respect to the e-line. In addition, a lateral chromatic aberration is illustrated with respect to the g-line (indicated with a chain double-dashed line). An F-number is represented by Fno and a half angle of field is represented by ω. Lateral aberrations are illustrated on a meridional image plane (meri) (indicated with a solid line) with respect to the e-line, and a sagittal image plane (Sagi) (indicated with a dotted line) with respect to the e-line, and the g-line (indicated with a chain double-dashed line).

In each longitudinal aberration graph, the spherical aberration, the astigmatism, a distortion, and the lateral chromatic aberration are illustrated in scales of 0.4 mm, 0.4 mm, 5%, and 0.05 mm, respectively. The lateral aberration is illustrated in a scale of 0.05 mm. Note that, in the following embodiments, a wide-angle end and a telephoto end are zoom positions at which the second lens unit U2 for varying magnification is positioned at each end of the movable range on the optical axis with respect to the mechanism.

Next, the first lens unit U1 according to this embodiment is described. The first lens unit U1 corresponds to first to fourteenth surfaces. The first lens unit U1 includes a first sub lens unit U11 having negative refractive power which does not move for focusing, a second sub lens unit U12 having positive refractive power which moves toward the image side when focusing from an object at infinity to an object at close range, and a third sub lens unit U13 having positive refractive power which moves toward the object side when focusing from an object at infinity to an object at close range. The first sub lens unit U11 includes, in order from the object side, a biconcave lens G1 and a meniscus convex lens G2 having a convex surface facing toward the object side. In addition, the second sub lens unit U12 includes a biconvex lens G3, a meniscus concave lens G4 having a convex surface facing toward the object side, and a biconvex lens G5. The third sub lens unit U13 includes a biconvex lens G6, and a meniscus convex lens G7 having a concave surface facing toward the image side. The second lens unit U2 includes a convex lens and a concave lens and includes five lenses as a whole. In addition, the third lens unit U3 includes a cemented lens in which a biconcave lens and a meniscus convex lens having a concave surface facing toward the image side are cemented to each other. The fourth lens unit U4 includes a convex lens and a concave lens and includes ten lenses as a whole.

Corresponding values of expressions according to this embodiment are shown in Table 1. This embodiment satisfies the expressions (1) to (11), and the focus fluctuation at the telephoto end is appropriately corrected by appropriately setting a configuration and paraxial arrangement of the first lens unit and movement amounts of the second sub lens unit and the third sub lens unit for focusing. As a result, downsizing is achieved while maintaining high optical performance in the entire zoom region and in the entire focus region.

Figure 17:
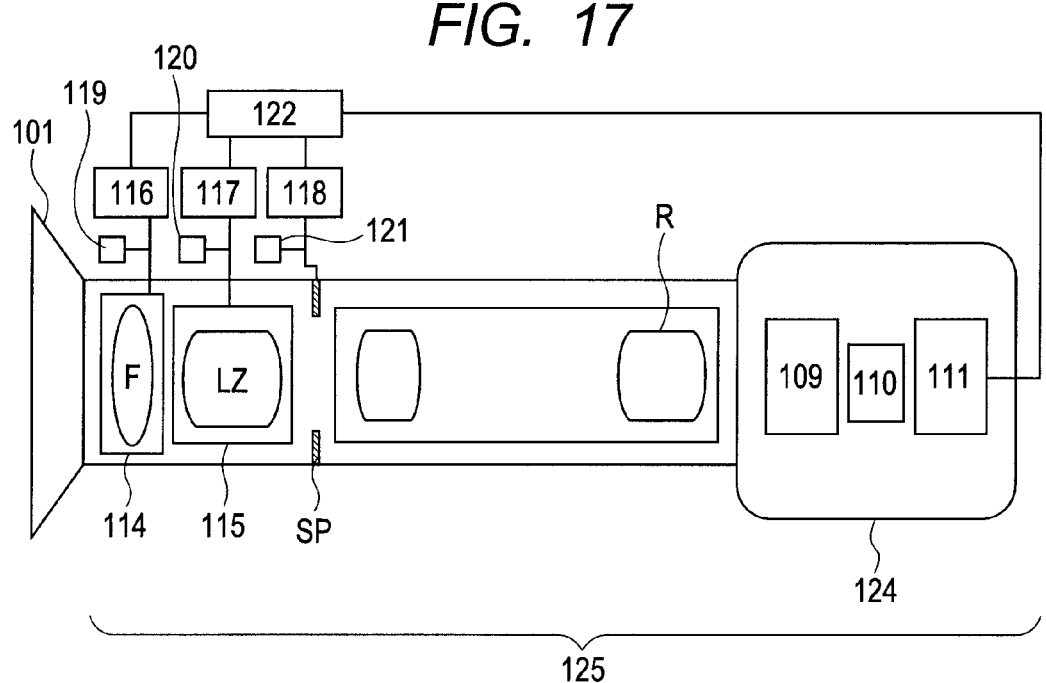
FIG. 17 is a schematic diagram of an image pickup apparatus according to the present invention.

FIG. 17 is a schematic diagram illustrating an image pickup apparatus (television camera system) having the zoom lens according to each embodiment as an image pickup optical system. Referring to FIG. 17, an image pickup apparatus 125 includes a camera 124 and a zoom lens 101, which is any one of the zoom lenses according to Embodiments 1 to 4. The zoom lens 101 may be removably mounted on the camera 124. The zoom lens 101 includes a first lens unit F, a magnification-varying unit LZ, and a fourth lens unit R for imaging. The first lens unit F includes a focusing lens unit. The magnification-varying unit LZ includes a second lens unit which moves on the optical axis for varying magnification. In addition, the magnification varying unit LZ includes a third lens unit which moves on the optical axis for correcting an image plane variation due to varying magnification. An aperture stop is represented by SP. The first lens unit F and the magnification-varying unit LZ are driven to move in the optical axis direction respectively by drive mechanisms 114 and 115 such as a helicoid or a cam. Motors (drive units) 116 to 118 electrically drive the drive mechanisms 114 and 115 and the aperture stop SP, respectively. Detectors 119 to 121, such as an encoder, a potentiometer, or a photo-sensor, are configured to detect the position of the first unit F or the position of the magnification varying unit LZ on the optical axis, and the aperture diameter of the aperture stop SP. In addition, the camera 124 includes a glass block 109, which corresponds to an optical filter or a color separating optical system provided within the camera 124. Further, the camera 124 includes a solid-state image pickup element (photoelectrical conversion element) 110, such as a charge-coupled device (CCD) sensor or a complementary metal-oxide semiconductor (CMOS) sensor, which are configured to receive an object image formed by the zoom lens 101. Further, central processing units (CPUs) 111 and 122 control the driving of the camera 124 and the zoom lens 101, respectively.

Through application of the zoom lens according to each embodiment of the present invention to a television camera as described above, an image pickup apparatus having high optical performance may be implemented.

Hereinafter, Numerical Embodiment 1, corresponding to Embodiment 1 of the present invention, is described. In each of the Numerical Embodiments, "i" represents the order of a surface from the object side, "ri" represents a curvature radius of an i-th surface from the object side, "di" represents an interval between the i-th surface and the (i+1)th surface from the object side, and "ndi" and "vdi" respectively represent a refractive index and an Abbe number of the i-th optical member. "BF" represents an air-equivalent back focus. Three final surfaces are a glass block, such as a filter.

The aspheric shape is expressed in the following expression:

$$X = \frac{H^2/R}{1+\sqrt{1-(1+k)(H/R)^2}} + A4H^4 + A6H^6 + A8H^8 +$$
$$A10H^{10} + A12H^{12} + A3H^3 + A5H^5 + A7H^7 + A9H^9 + A11H^{11}$$

where an X axis corresponds to the optical axis, an H axis corresponds to an axis perpendicular to the optical axis, a travelling direction of light corresponds to a positive direction, R represents a paraxial curvature radius, k represents a conic coefficient, each of A4, A6, A8, A10, A12, A3, A5, A7, A9, and A11 represents an aspheric coefficient, and "e-Z" means "×10$^{-Z}$".

Embodiment 2

Figure 5A:
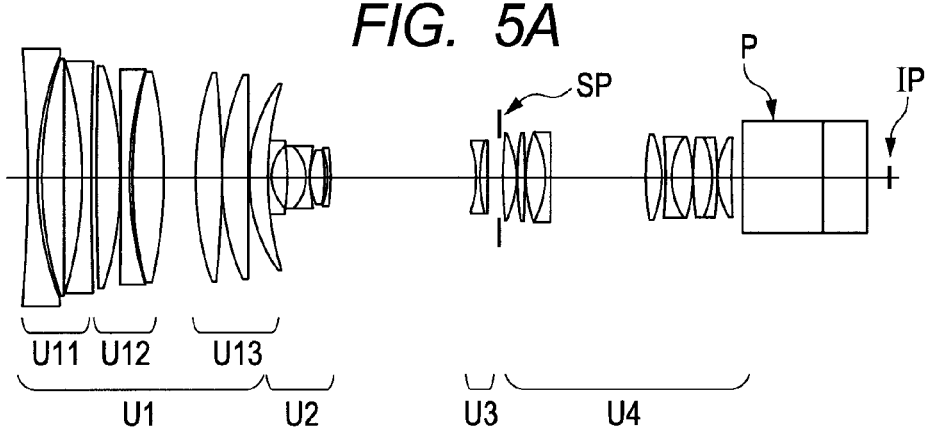
FIG. 5A is a lens cross-sectional view of a zoom lens according to Numerical Embodiment 2 of the present invention at a wide-angle end when focusing at infinity.
Figure 5B:
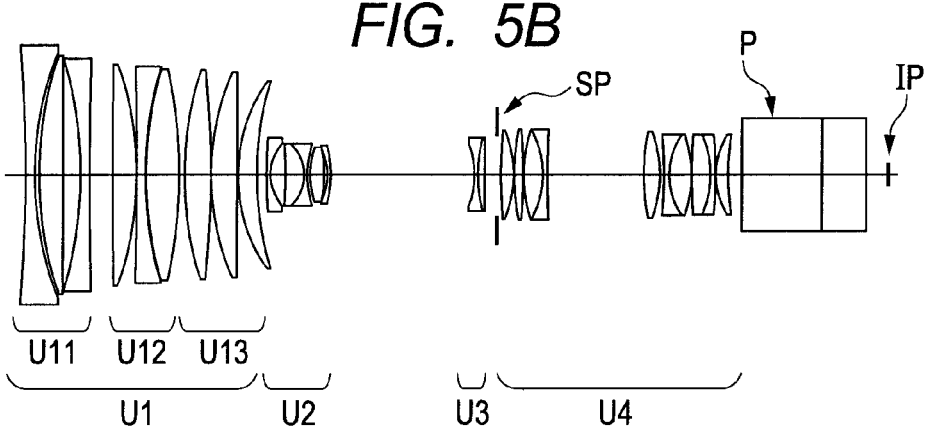
FIG. 5B is a lens cross-sectional view of the zoom lens according to Numerical Embodiment 2 at the wide-angle end when focusing at a minimum object distance.
Figure 6A:
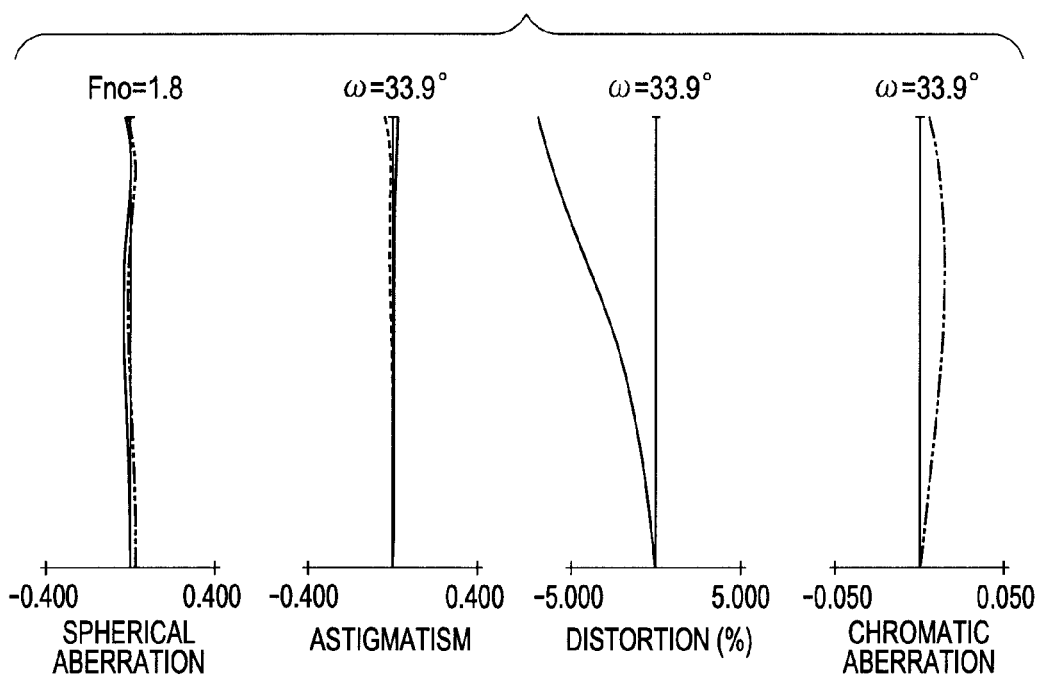
FIG. 6A is a longitudinal aberration graph of the zoom lens according to Numerical Embodiment 2 at the wide-angle end when focusing at infinity.
Figure 6B:
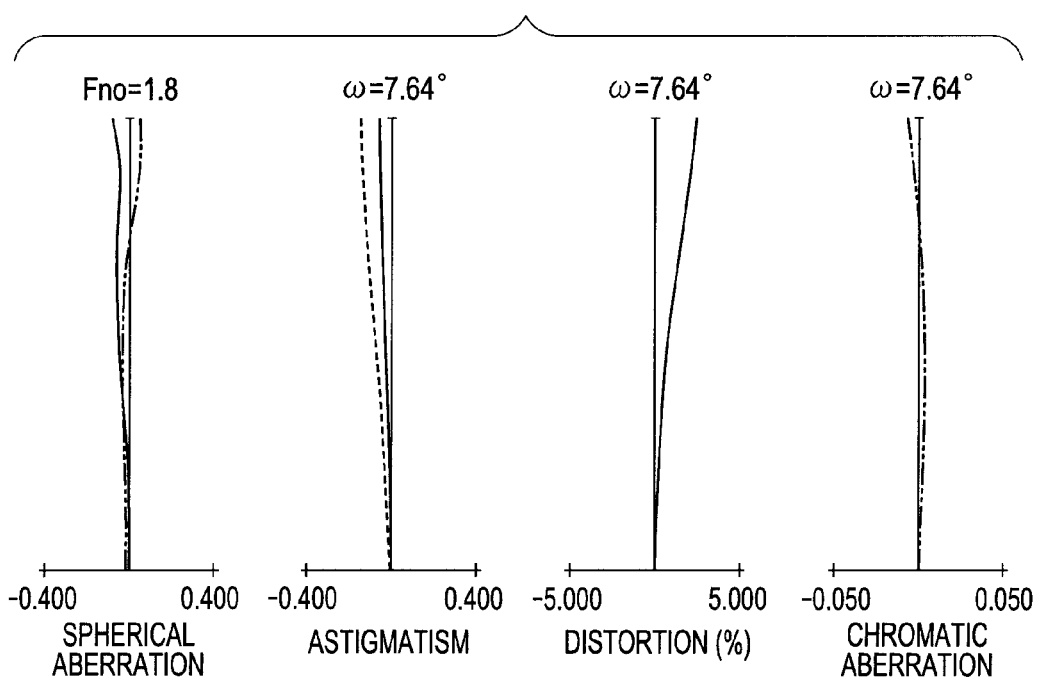
FIG. 6B is a longitudinal aberration graph of the zoom lens according to Numerical Embodiment 2 at a focal length of 41 mm when focusing at infinity.
Figure 7A:
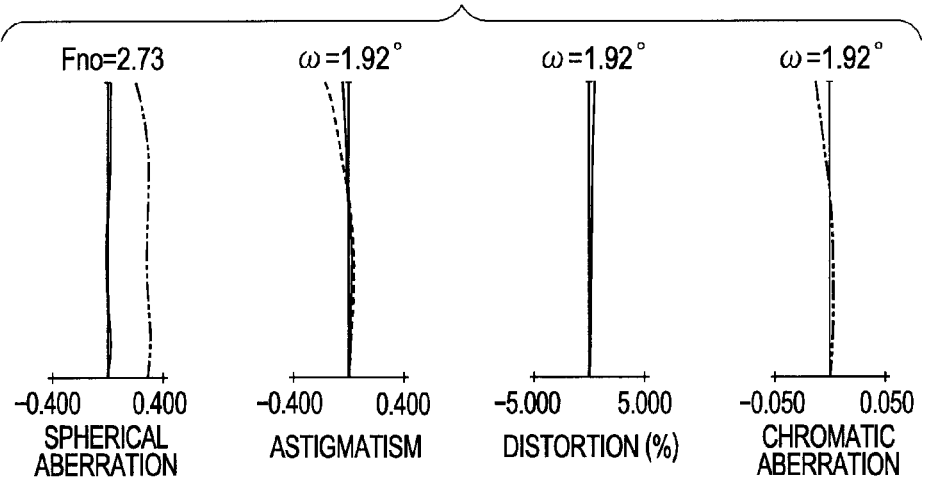
FIG. 7A is a longitudinal aberration graph of the zoom lens according to Numerical Embodiment 2 at a telephoto end when focusing at infinity.
Figure 7B:
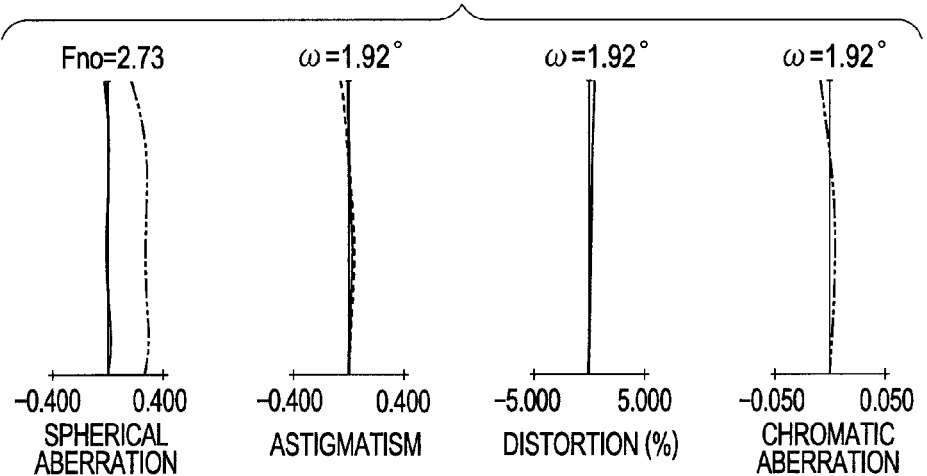
FIG. 7B is a longitudinal aberration graph of the zoom lens according to Numerical Embodiment 2 at the telephoto end when focusing at an object distance of 2.5 m.
Figure 7C:
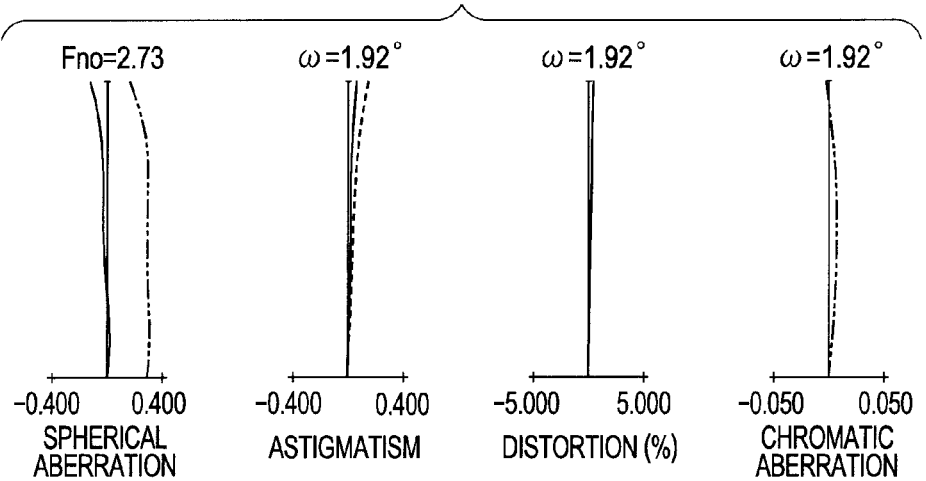
FIG. 7C is a longitudinal aberration graph of the zoom lens according to Numerical Embodiment 2 at the telephoto end when focusing at the minimum object distance.
Figure 8A:
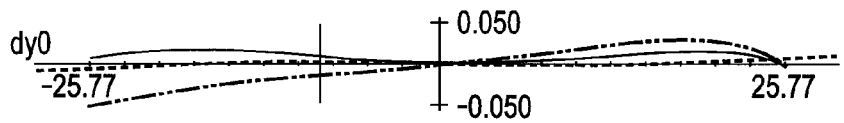
FIG. 8A is a lateral aberration graph of the zoom lens according to Numerical Embodiment 2 at the telephoto end with an image height of 4 mm when focusing at infinity.
Figure 8B:
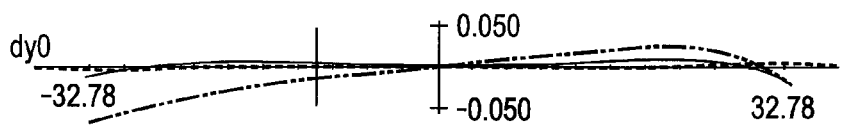
FIG. 8B is a lateral aberration graph of the zoom lens according to Numerical Embodiment 2 at the telephoto end with an image height of 4 mm when focusing at an object distance of 2.5 m.
Figure 8C:
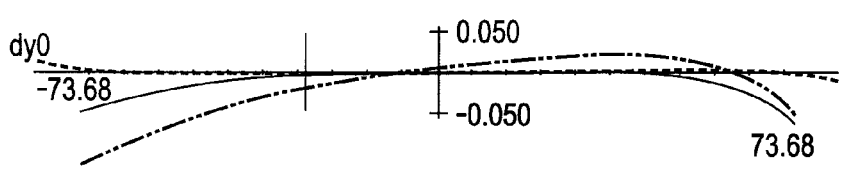
FIG. 8C is a lateral aberration graph of the zoom lens according to Numerical Embodiment 2 at the telephoto end with an image height of 4 mm when focusing at the minimum object distance.

In a zoom lens according to Embodiment 2 (Numerical Embodiment 2) of the present invention, a lens cross-sectional view at a wide-angle end when focusing on an object at infinity is illustrated in FIG. 5A, and a lens cross-sectional view at the wide-angle end when focusing on an object at the minimum object distance (0.82 m) is illustrated in FIG. 5B. A longitudinal aberration graph of Numerical Embodiment 2 at the wide-angle end when focusing on an object at infinity is illustrated in FIG. 6A. A longitudinal aberration graph of Numerical Embodiment 2 at a focal length of 41 mm when focusing on an object at infinity is illustrated in FIG. 6B. FIGS. 7A to 7C illustrate longitudinal aberration graphs of Numerical Embodiment 2 at a telephoto end. The longitudinal aberration graph when focusing on an object at infinity is illustrated in FIG. 7A. The longitudinal aberration graph when focusing at an object distance of 2.5 m is illustrated in FIG. 7B. The longitudinal aberration graph when focusing on an object at the minimum object distance is illustrated in FIG. 7C. FIGS. 8A to 8C illustrate lateral aberration graphs of Numerical Embodiment 2 at the telephoto end with an image height of 4 mm. The lateral aberration graph when focusing on an object at infinity is illustrated in FIG. 8A. The lateral aberration graph when focusing at an object distance of 2.5 m is illustrated in FIG. 8B. The lateral aberration graph when focusing on an object at the minimum object distance is illustrated in FIG. 8C.

As shown in FIGS. 5A and 5B, the zoom lens includes, in order from the object side: a first lens unit (focus lens unit) U1 having positive refractive power which moves during focusing (but does not move for varying magnification); a second lens unit (variator) U2 for varying magnification having negative refractive power which moves toward the image side when varying magnification from the wide-angle end to the telephoto end; a third lens unit (compensator) U3 having negative refractive power which moves non-linearly on the optical axis in association with a movement of the second lens unit U2 so as to correct an image plane variation due to varying magnification (as a magnification-varying lens unit which moves during varying magnification); and a fourth lens unit (relay lens unit) U4 having positive refractive power for an image forming action which does not move for varying magnification (as a fixed lens unit).

Next, the first lens unit U1 according to this embodiment is described. The first lens unit U1 corresponds to first to eighteenth surfaces. The first lens unit U1 includes a first sub lens unit U11 having negative refractive power which does not move for focusing, a second sub lens unit U12 having positive refractive power which moves toward the image side when focusing from an object at infinity to an object at close range, and a third sub lens unit U13 having positive refractive power which moves toward the object side when focusing from an object at infinity to an object at close range. The first sub lens unit U11 includes, in order from the object side, a biconcave lens G1, a biconvex lens G2, and a biconcave lens G3. In addition, the second sub lens unit U12 includes a biconvex lens G4, a biconcave lens G5, and a biconvex lens G6. The third sub lens unit U13 includes a biconvex lens G7, a biconvex lens G8, and a meniscus convex lens G9 having a concave surface facing toward the image side. The second lens unit U2 includes a convex lens and a concave lens and includes five lenses as a whole. In addition, the third lens unit U3 includes a cemented lens in which a biconcave lens and a biconvex lens are cemented to each other. The fourth lens unit U4 includes a convex lens and a concave lens and includes ten lenses as a whole.

Corresponding values of expressions according to this embodiment are shown in Table 1. This embodiment satisfies the expressions (1) to (11), and the focus fluctuation at the telephoto end is appropriately corrected by appropriately setting a configuration and paraxial arrangement of the first lens unit and movement amounts of the second sub lens unit and the third sub lens unit for focusing. As a result, downsizing is achieved while maintaining high optical performance in the entire zoom region and in the entire focus region.

Embodiment 3

Figure 9A:
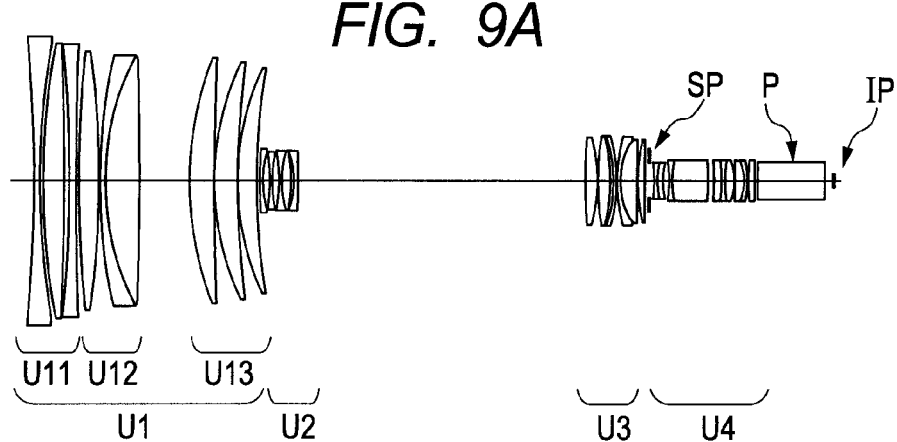
FIG. 9A is a lens cross-sectional view of a zoom lens according to Numerical Embodiment 3 of the present invention at a wide-angle end when focusing at infinity.
Figure 9B:
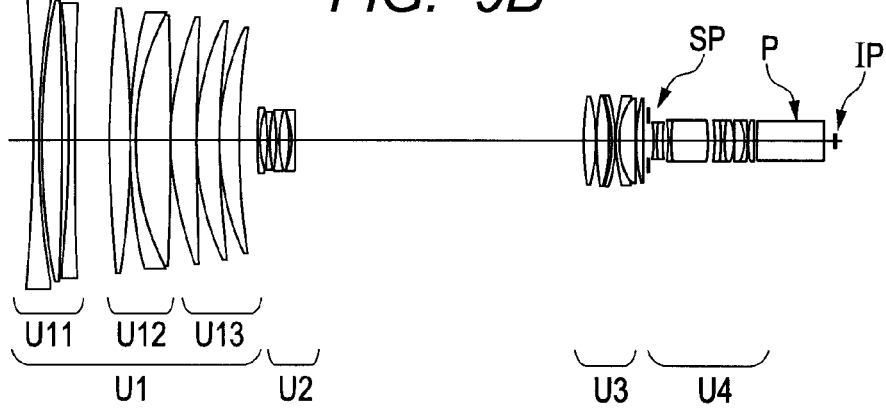
FIG. 9B is a lens cross-sectional view of the zoom lens according to Numerical Embodiment 3 at the wide-angle end when focusing at a minimum object distance.
Figure 10A:
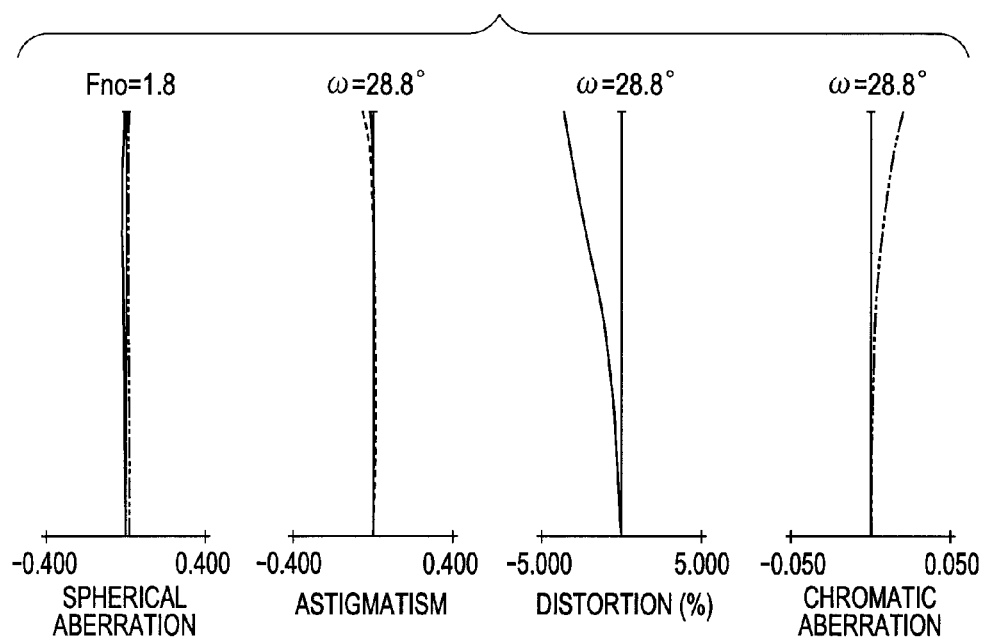
FIG. 10A is a longitudinal aberration graph of the zoom lens according to Numerical Embodiment 3 at the wide-angle end when focusing at infinity.
Figure 10B:
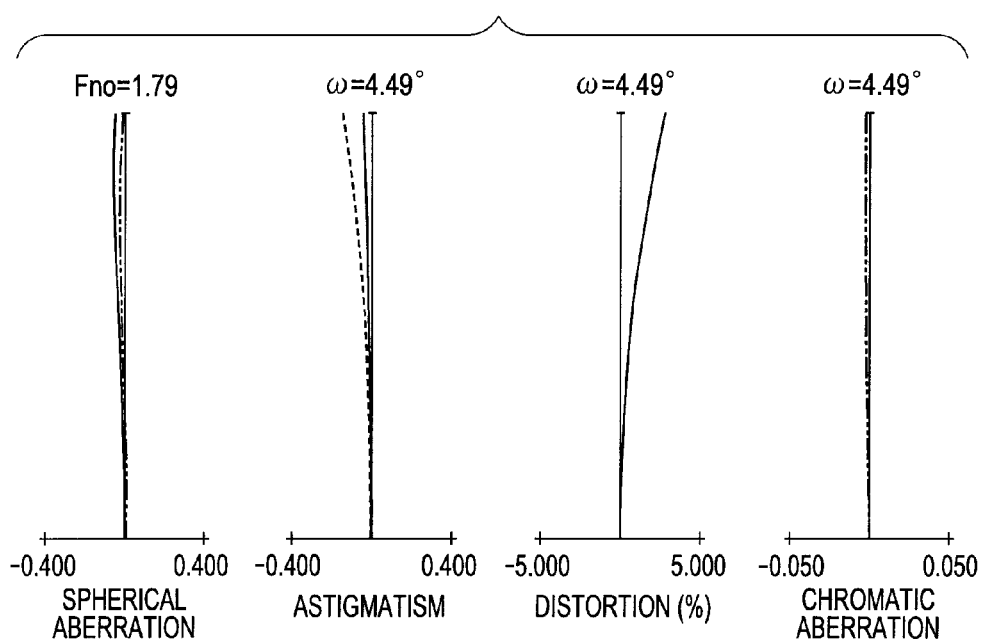
FIG. 10B is a longitudinal aberration graph of the zoom lens according to Numerical Embodiment 3 at a focal length of 70 mm when focusing at infinity.
Figure 11A:
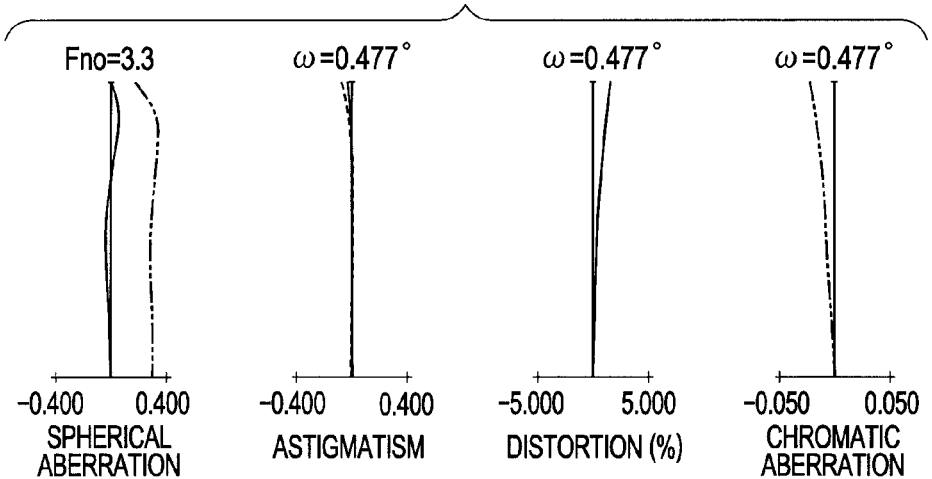
FIG. 11A is a longitudinal aberration graph of the zoom lens according to Numerical Embodiment 3 at a telephoto end when focusing at infinity.
Figure 11B:
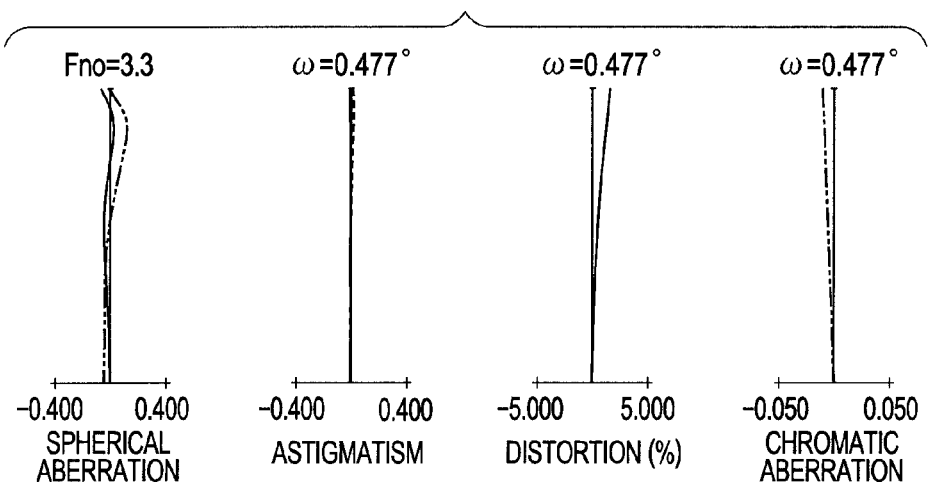
FIG. 11B is a longitudinal aberration graph of the zoom lens according to Numerical Embodiment 3 at the telephoto end when focusing at an object distance of 7 m.
Figure 11C:
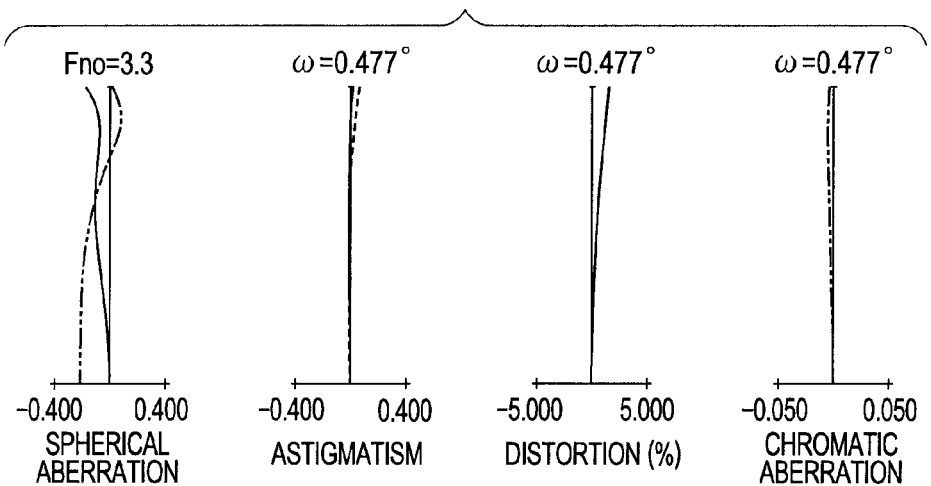
FIG. 11C is a longitudinal aberration graph of the zoom lens according to Numerical Embodiment 3 at the telephoto end when focusing at the minimum object distance.
Figure 12A:
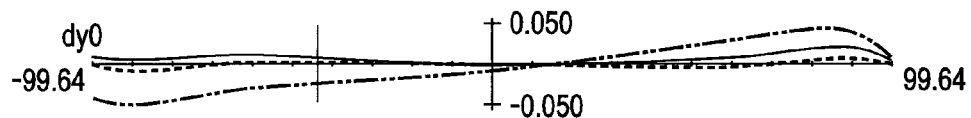
FIG. 12A is a lateral aberration graph of the zoom lens according to Numerical Embodiment 3 at the telephoto end with an image height of 4 mm when focusing at infinity.
Figure 12B:
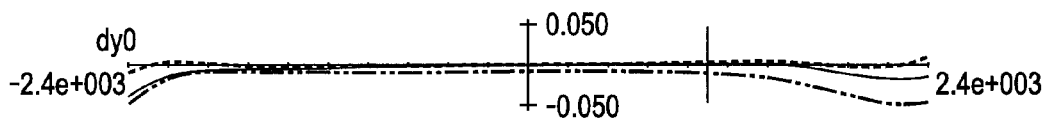
FIG. 12B is a lateral aberration graph of the zoom lens according to Numerical Embodiment 3 at the telephoto end with an image height of 4 mm when focusing at an object distance of 7 m.
Figure 12C:
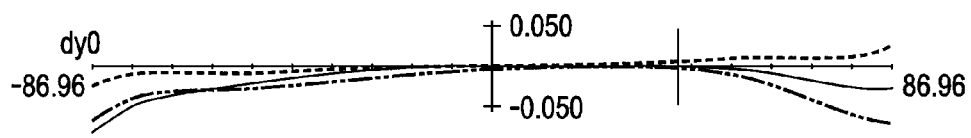
FIG. 12C is a lateral aberration graph of the zoom lens according to Numerical Embodiment 3 at the telephoto end with an image height of 4 mm when focusing at the minimum object distance.

In a zoom lens according to Embodiment 3 (Numerical Embodiment 3) of the present invention, a lens cross-sectional view at a wide-angle end when focusing on an object at infinity is illustrated in FIG. 9A, and a lens cross-sectional view at the wide-angle end when focusing on an object at the minimum object distance (3.5 m) is illustrated in FIG. 9B. A longitudinal aberration graph of Numerical Embodiment 3 at the wide-angle end when focusing on an object at infinity is illustrated in FIG. 10A. A longitudinal aberration graph of Numerical Embodiment 3 at a focal length of 70 mm when focusing on an object at infinity is illustrated in FIG. 10B. FIGS. 11A to 11C illustrate longitudinal aberration graphs of Numerical Embodiment 3 at a telephoto end. The longitudinal aberration graph when focusing on an object at infinity is illustrated in FIG. 11A. The longitudinal aberration graph when focusing at an object distance of 7 m is illustrated in FIG. 11B. The longitudinal aberration graph when focusing on an object at the minimum object distance is illustrated in FIG. 11C. FIGS. 12A to 12C illustrate lateral aberration graphs of Numerical Embodiment 3 at the telephoto end with an image height of 4 mm. The lateral aberration graph when focusing on an object at infinity is illustrated in FIG. 12A. The lateral aberration graph when focusing at an object distance of 7 m is illustrated in FIG. 12B. The lateral aberration graph when focusing on an object at the minimum object distance is illustrated in FIG. 12C.

As shown in FIGS. 9A and 9B, the zoom lens includes, in order from the object side: a first lens unit (focus lens unit) U1 having positive refractive power which moves during focusing (but does not move for varying magnification); a second lens unit (variator) U2 for varying magnification having negative refractive power which moves toward the image side when varying magnification from the wide-angle end to the telephoto end; a third lens unit (compensator) U3 having positive refractive power which moves non-linearly on the optical axis in association with a movement of the second lens unit U2 so as to correct an image plane variation due to varying magnification (as a magnification-varying lens unit which moves during varying magnification); and a fourth lens unit (relay lens unit) U4 having positive refractive power for an image forming action which does not move for varying magnification (as a fixed lens unit).

Next, the first lens unit U1 according to this embodiment is described. The first lens unit U1 corresponds to first to eighteenth surfaces. The first lens unit U1 includes a first sub lens unit U11 having negative refractive power which does not move for focusing, a second sub lens unit U12 having positive refractive power which moves toward the image side when focusing from an object at infinity to an object at close range, and a third sub lens unit U13 having positive refractive power which moves toward the object side when focusing from an object at infinity to an object at close range. The first sub lens unit U11 includes, in order from the object side, a biconcave lens G1, a biconvex lens G2, and biconcave lens G3. In addition, the second sub lens unit U12 includes a biconvex lens G4, a meniscus concave lens G5 having a convex surface facing toward the object side, and a biconvex lens G6. The third sub lens unit U13 includes a meniscus convex lens G7 having a concave surface facing toward the image side, a meniscus convex lens G8 having a concave surface facing toward the image side, and a meniscus convex lens G9 having a concave surface facing toward the image side. The second lens unit U2 includes a convex lens and a concave lens and includes five lenses as a whole. In addition, the third lens unit U3 includes a convex lens and a concave lens and includes six lenses as a whole. The fourth lens unit U4 includes a convex lens and a concave lens and includes ten lenses as a whole.

Corresponding values of expressions according to this embodiment are shown in Table 1. This embodiment satisfies the expressions (1) to (11), and the focus fluctuation at the telephoto end is appropriately corrected by appropriately setting a configuration and paraxial arrangement of the first lens unit and movement amounts of the second sub lens unit and the third sub lens unit for focusing. As a result, downsizing is achieved while maintaining high optical performance in the entire zoom region and in the entire focus region.

Embodiment 4

Figure 13A:
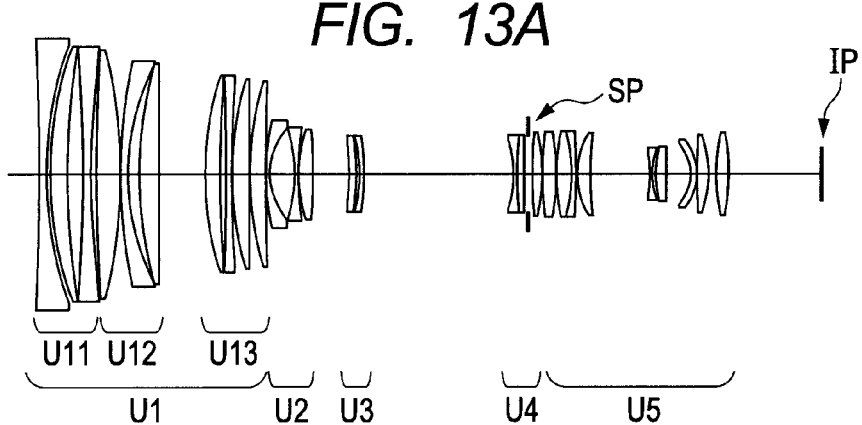
FIG. 13A is a lens cross-sectional view of a zoom lens according to Numerical Embodiment 4 of the present invention at a wide-angle end when focusing at infinity.
Figure 13B:
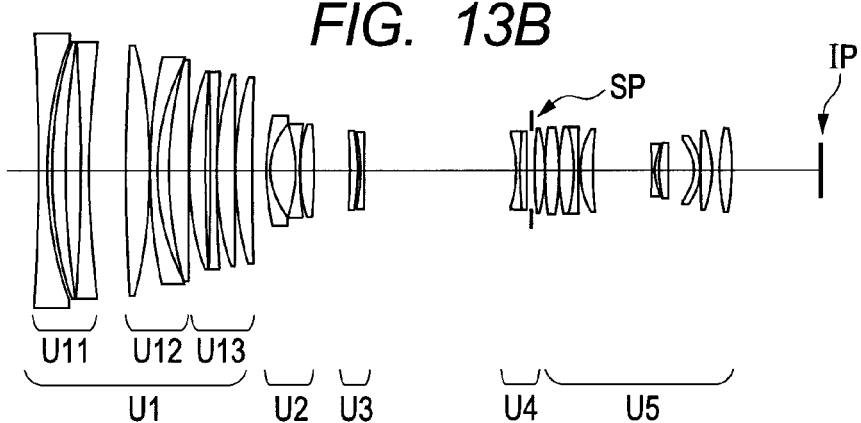
FIG. 13B is a lens cross-sectional view of the zoom lens according to Numerical Embodiment 4 at the wide-angle end when focusing at a minimum object distance.
Figure 14A:
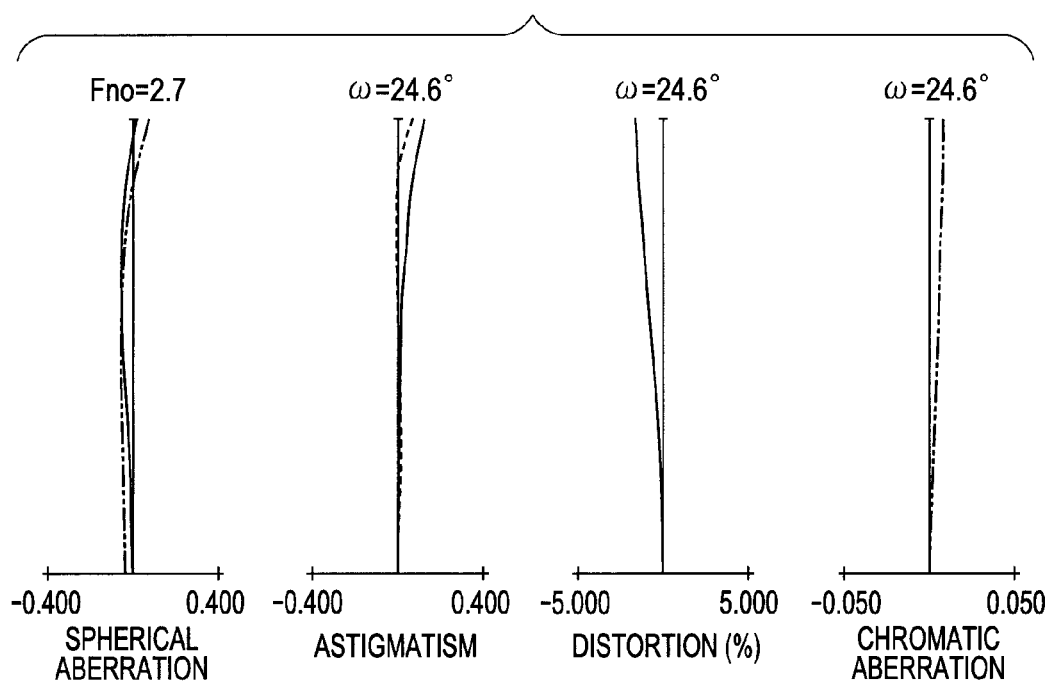
FIG. 14A is a longitudinal aberration graph of the zoom lens according to Numerical Embodiment 4 at the wide-angle end when focusing at infinity.
Figure 14B:
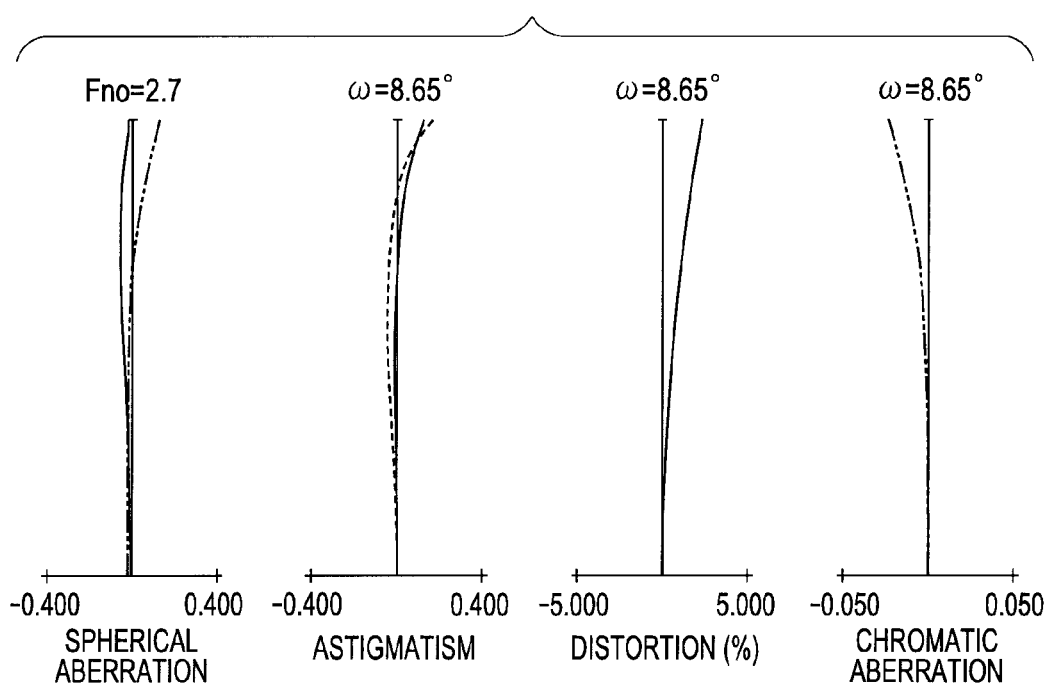
FIG. 14B is a longitudinal aberration graph of the zoom lens according to Numerical Embodiment 4 at a focal length of 102 mm when focusing at infinity.
Figure 15A:
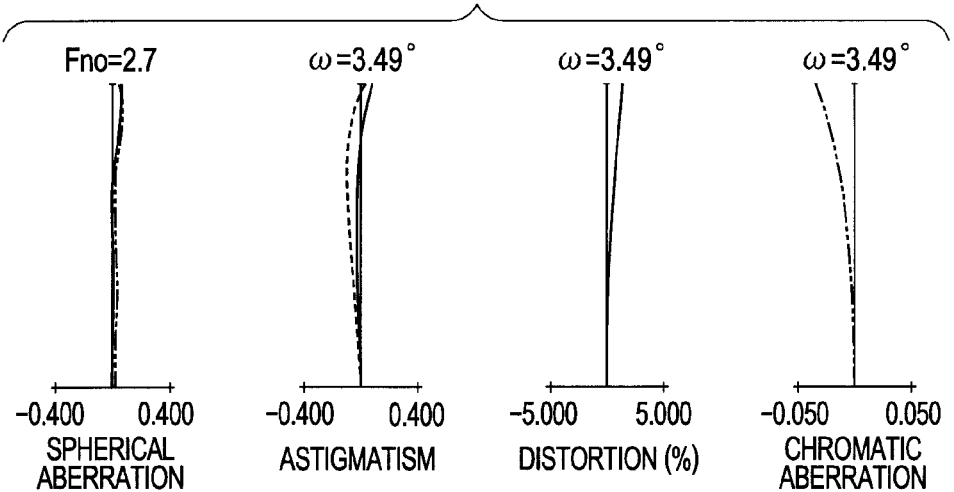
FIG. 15A is a longitudinal aberration graph of the zoom lens according to Numerical Embodiment 4 at a telephoto end when focusing at infinity.
Figure 15B:
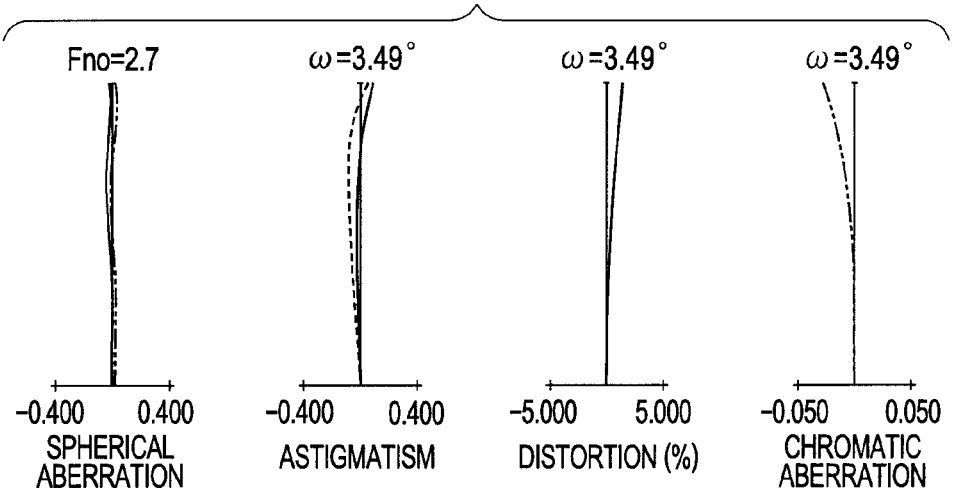
FIG. 15B is a longitudinal aberration graph of the zoom lens according to Numerical Embodiment 4 at the telephoto end when focusing at an object distance of 7 m.
Figure 15C:
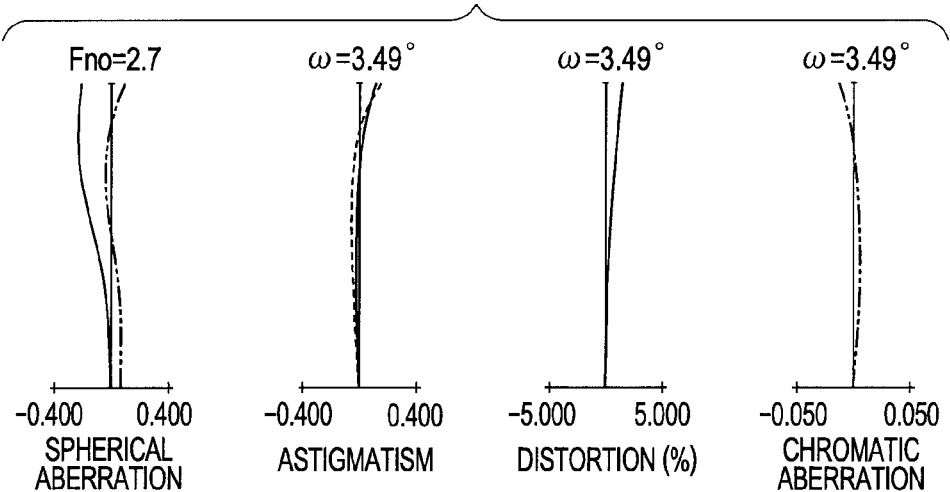
FIG. 15C is a longitudinal aberration graph of the zoom lens according to Numerical Embodiment 4 at the telephoto end when focusing at the minimum object distance.
Figure 16A:
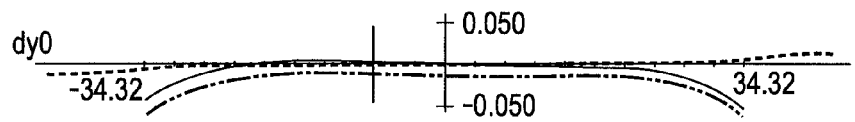
FIG. 16A is a lateral aberration graph of the zoom lens according to Numerical Embodiment 4 at the telephoto end with an image height of 11 mm when focusing at infinity.
Figure 16B:
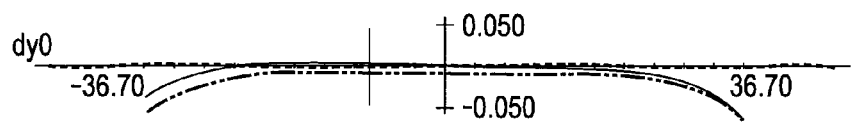
FIG. 16B is a lateral aberration graph of the zoom lens according to Numerical Embodiment 4 at the telephoto end with an image height of 11 mm when focusing at an object distance of 7 m.
Figure 16C:
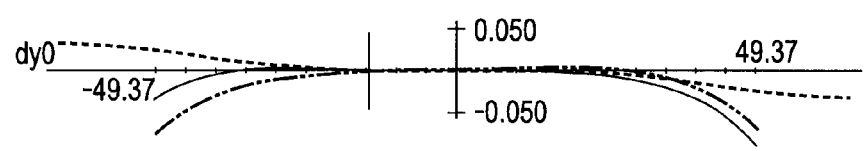
FIG. 16C is a lateral aberration graph of the zoom lens according to Numerical Embodiment 4 at the telephoto end with an image height of 11 mm when focusing at the minimum object distance.

In a zoom lens according to Embodiment 4 (Numerical Embodiment 4) of the present invention, a lens cross-sectional view at a wide-angle end when focusing on an object at infinity is illustrated in FIG. 13A, and a lens cross-sectional view at the wide-angle end when focusing on an object at the minimum object distance (1.5 m) is illustrated in FIG. 13B. A longitudinal aberration graph of Numerical Embodiment 4 at the wide-angle end when focusing on an object at infinity is illustrated in FIG. 14A. A longitudinal aberration graph of Numerical Embodiment 4 at a focal length of 102 mm when focusing on an object at infinity is illustrated in FIG. 14B. FIGS. 15A to 15C illustrate longitudinal aberration graphs of Numerical Embodiment 4 at a telephoto end. The longitudinal aberration graph when focusing on an object at infinity is illustrated in FIG. 15A. The longitudinal aberration graph when focusing at an object distance of 7 m is illustrated in FIG. 15B. The longitudinal aberration graph when focusing on an object at the minimum object distance is illustrated in FIG. 15C. FIGS. 16A to 16C illustrate lateral aberration graphs of Numerical Embodiment 4 at the telephoto end with an image height of 11 mm. The lateral aberration graph when focusing on an object at infinity is illustrated in FIG. 16A. The lateral aberration graph when focusing at an object distance of 7 m is illustrated in FIG. 16B. The lateral aberration graph when focusing on an object at the minimum object distance is illustrated in FIG. 16C.

As shown in FIGS. 13A and 13B, the zoom lens includes, in order from the object side; a first lens unit (focus lens unit) U1 having positive refractive power which moves during focusing (but does not move for varying magnification); a second lens unit (first variator) U2 for varying magnification having negative refractive power which moves toward the image side when varying magnification from the wide-angle end to the telephoto end; a third lens unit (second variator) U3 having negative refractive power (as one lens unit constituting a magnification-varying lens unit which moves during varying magnification); a fourth lens unit (compensator) U4 having negative refractive power which moves non-linearly on the optical axis in association with movements of the second lens unit U2 and the third lens unit U3 so as to correct an image plane variation due to varying magnification (as another lens unit constituting the magnification-varying lens unit which moves during varying magnification); and a fifth lens unit (relay lens unit) U5 having positive refractive power for an image forming action which does not move for varying magnification (as a fixed lens unit). Note that, the third lens unit U3 may be the compensator, and the fourth lens unit U4 may be the second variator.

Next, the first lens unit U1 according to this embodiment is described. The first lens unit U1 corresponds to first to twentieth surfaces. The first lens unit U1 includes a first sub lens unit U11 having negative refractive power which does not move for focusing, a second sub lens unit U12 having positive refractive power which moves toward the image side when focusing from an object at infinity to an object at close range, and a third sub lens unit U13 having positive refractive power which moves toward the object side when focusing from an object at infinity to an object at close range. The first sub lens unit U11 includes, in order from the object side, a biconcave lens G1, a meniscus convex lens G2 having a concave surface facing toward the image side, and a biconcave lens G3. In addition, the second sub lens unit U12 includes a biconvex lens G4, a meniscus concave lens G5 having a convex surface facing toward the object side, and a biconvex lens G6. The third sub lens unit U13 includes a meniscus convex lens G7 having a concave surface facing toward the image side, a biconvex lens G8, a meniscus convex lens G9 having a concave surface facing toward the image side, and a meniscus convex lens G10 having a concave surface facing toward the image side. The second lens unit U2 includes a convex lens and a concave lens and includes three lenses as a whole. The third lens unit U3 includes one convex lens and one concave lens. In addition, the fourth lens unit U4 includes a cemented lens in which a biconcave lens and a biconvex lens are cemented to each other. The fifth lens unit U5 includes a convex lens and a concave lens and includes ten lenses as a whole.

Corresponding values of expressions according to this embodiment are shown in Table 1. This embodiment satisfies the expressions (1) to (11), and the focus fluctuation at the telephoto end is appropriately corrected by appropriately setting a configuration and paraxial arrangement of the first lens unit and movement amounts of the second sub lens unit and the third sub lens unit for focusing. As a result, downsizing is achieved while maintaining high optical performance in the entire zoom region and in the entire focus region. In addition, with the satisfaction of the expressions (1) to (11), it is also possible to provide a high-performance small zoom lens with a large aperture ratio and a high magnification-varying ratio having an F-number of approximately 1.8 to 2.7 at the wide-angle end, a field angle of approximately 50 to 70 degrees at the wide-angle end, a field angle of approximately 1 to 8 degrees at the telephoto end, and a magnification-varying ratio of approximately 7 to 70.

The exemplary embodiments of the present invention are described above, but the present invention is not limited to those embodiments, which can be modified and changed variously within the scope of the spirit thereof.

Numerical Embodiment 1

Unit: mm

Surface data

| Surface Number | r | d | nd | vd | Effective diameter |
|---|---|---|---|---|---|
| 1 | −366.344 | 4.00 | 1.77250 | 49.6 | 114.17 |
| 2 | 282.863 | 1.00 | | | 112.53 |
| 3 | 229.846 | 7.85 | 1.78472 | 25.7 | 112.88 |
| 4 | 502.001 | 2.00 | | | 112.30 |
| 5 | 536.065 | 10.65 | 1.59522 | 67.7 | 112.16 |
| 6 | −338.895 | 0.12 | | | 111.77 |
| 7 | 328.568 | 2.68 | 1.84666 | 23.8 | 107.90 |
| 8 | 151.888 | 4.35 | | | 105.02 |
| 9 | 247.993 | 13.97 | 1.43387 | 95.1 | 104.97 |
| 10 | −324.876 | 13.75 | | | 104.19 |
| 11 | 122.522 | 15.53 | 1.43387 | 95.1 | 100.08 |
| 12 | −7767.241 | 0.12 | | | 98.67 |
| 13 | 106.612 | 9.90 | 1.59240 | 68.3 | 93.77 |
| 14 | 235.302 | (Variable) | | | 91.53 |
| 15 | 115.096 | 1.00 | 1.81600 | 46.6 | 31.05 |
| 16 | 18.223 | 6.82 | | | 25.91 |
| 17 | −89.049 | 6.48 | 1.80518 | 25.4 | 25.78 |
| 18 | −17.561 | 1.00 | 1.81600 | 46.6 | 25.76 |
| 19 | 103.729 | 0.25 | | | 25.73 |
| 20 | 30.815 | 6.97 | 1.56732 | 42.8 | 26.21 |
| 21 | −63.862 | 1.00 | 1.88300 | 40.8 | 25.62 |
| 22 | 184.822 | (Variable) | | | 25.33 |
| 23 | −44.988 | 1.00 | 1.79952 | 42.2 | 29.78 |
| 24 | 57.570 | 3.41 | 1.92286 | 21.3 | 32.22 |
| 25 | 914.365 | (Variable) | | | 32.65 |
| 26 (Stop) | ∞ | 1.30 | | | 35.55 |
| 27 | 1384.436 | 5.25 | 1.62041 | 60.3 | 36.60 |
| 28 | −51.145 | 0.20 | | | 37.28 |
| 29 | 110.527 | 4.21 | 1.51823 | 58.9 | 38.42 |
| 30 | −161.931 | 0.20 | | | 38.45 |
| 31 | 43.436 | 9.10 | 1.48749 | 70.2 | 37.87 |
| 32 | −61.248 | 1.50 | 1.83400 | 37.2 | 37.17 |
| 33 | 91.884 | 42.50 | | | 36.11 |
| 34 | −9205.397 | 4.94 | 1.51823 | 58.9 | 36.85 |
| 35 | −54.256 | 0.70 | | | 36.87 |
| 36 | 68.482 | 1.50 | 1.79952 | 42.2 | 34.57 |
| 37 | 29.516 | 6.45 | 1.51823 | 59.0 | 32.71 |
| 38 | 188.141 | 0.33 | | | 32.09 |
| 39 | 33.043 | 7.87 | 1.48749 | 70.2 | 30.88 |
| 40 | −67.049 | 1.50 | 1.78590 | 44.2 | 29.51 |
| 41 | 122.181 | 3.87 | | | 28.22 |
| 42 | −148.214 | 2.04 | 1.51823 | 58.9 | 27.50 |
| 43 | −125.900 | 5.50 | | | 27.24 |
| 44 | ∞ | 37.50 | 1.60342 | 38.0 | 40.00 |
| 45 | ∞ | 20.25 | 1.51633 | 64.2 | 40.00 |
| 46 | ∞ | (Variable) | | | 40.00 |
| Image plane | ∞ | | | | |

Various data
Zoom ratio 35.00

| | Wide angle | Intermediate | Telephoto |
|---|---|---|---|
| Focal length | 10.00 | 60.00 | 350.00 |
| F-number | 2.00 | 2.00 | 3.67 |
| Angle of field | 28.81 | 5.24 | 0.90 |
| Image height | 5.50 | 5.50 | 5.50 |

-continued

| | | | |
|---|---|---|---|
| Total lens length | 401.13 | 401.13 | 401.13 |
| BF | 8.55 | 8.55 | 8.55 |
| d14 | 0.96 | 81.47 | 108.39 |
| d22 | 117.04 | 26.27 | 12.68 |
| d25 | 4.00 | 14.26 | 0.92 |
| d46 | 8.55 | 8.55 | 8.55 |
| Entrance pupil position | 86.43 | 471.75 | 1113.03 |
| Exit pupil position | −370.80 | −370.80 | −370.80 |
| Front principal point | 96.16 | 522.26 | 1207.78 |
| Rear principal point | −1.45 | −51.45 | −175.45 |

Zoom lens unit data

| Unit | First surface | Focal length | Lens structure length | Front principal point | Rear principal point |
|---|---|---|---|---|---|
| 1 | 1 | 140.00 | 85.93 | 52.31 | −6.43 |
| 2 | 15 | −20.00 | 23.52 | 2.61 | −12.90 |
| 3 | 23 | −60.00 | 4.41 | 0.07 | −2.25 |
| 4 | 26 | 55.07 | 156.72 | 45.04 | −123.55 |

Movement amounts of second sub lens unit and third sub lens unit for focusing (Direction toward image side from object side is positive)

| Unit | Infinity | 7.0 m | Minimum distance (2.5 m) |
|---|---|---|---|
| Second sub lens unit | 0 | 1.71 | 4.79 |
| Third sub lens unit | 0 | −2.50 | −7.00 |

Numerical Embodiment 2

Unit mm

Surface data

| Surface Number | r | d | nd | vd | Effective diameter |
|---|---|---|---|---|---|
| 1 | −581.560 | 3.60 | 1.81600 | 46.6 | 91.23 |
| 2 | 114.534 | 1.69 | | | 83.63 |
| 3 | 135.266 | 8.70 | 1.75520 | 27.5 | 83.47 |
| 4 | −9473.376 | 6.39 | | | 82.45 |
| 5 | −143.320 | 3.30 | 1.69680 | 55.5 | 81.97 |
| 6 | 923.266 | 1.98 | | | 79.53 |
| 7 | 1350.079 | 8.90 | 1.59522 | 67.7 | 79.11 |
| 8 | −127.326 | 0.18 | | | 79.22 |
| 9 | −1033.545 | 3.20 | 1.80518 | 25.4 | 77.37 |
| 10 | 127.753 | 0.41 | | | 76.01 |
| 11 | 131.742 | 12.01 | 1.49700 | 81.5 | 76.07 |
| 12 | −166.683 | 11.46 | | | 76.00 |
| 13 | 126.967 | 9.30 | 1.43387 | 95.1 | 74.52 |
| 14 | −408.403 | 0.20 | | | 74.45 |
| 15 | 93.759 | 9.67 | 1.49700 | 81.5 | 73.26 |
| 16 | −1154.478 | 0.20 | | | 72.67 |
| 17 | 60.470 | 6.73 | 1.59240 | 68.3 | 66.38 |
| 18 | 119.776 | (Variable) | | | 65.26 |
| 19* | 315.540 | 1.00 | 1.88300 | 40.8 | 25.99 |
| 20 | 16.281 | 5.93 | | | 21.43 |
| 21 | −95.591 | 6.59 | 1.80518 | 25.4 | 20.83 |
| 22 | −15.769 | 1.00 | 1.75500 | 52.3 | 20.34 |
| 23 | 28.928 | 0.68 | | | 19.05 |
| 24 | 23.559 | 5.61 | 1.60342 | 38.0 | 19.24 |
| 25 | −38.858 | 0.88 | | | 19.19 |
| 26 | −22.675 | 1.00 | 1.83481 | 42.7 | 19.20 |

-continued

| | | | | | |
|---|---|---|---|---|---|
| 27 | −68.101 | (Variable) | | | 19.90 |
| 28 | −28.182 | 1.00 | 1.74320 | 49.3 | 22.39 |
| 29 | 45.162 | 2.80 | 1.84666 | 23.8 | 25.03 |
| 30 | −2439.799 | (Variable) | | | 25.47 |
| 31 (Stop) | ∞ | 1.30 | | | 29.34 |
| 32 | 325.852 | 4.88 | 1.65844 | 50.9 | 30.79 |
| 33 | −37.961 | 0.15 | | | 31.30 |
| 34 | 89.242 | 3.20 | 1.51823 | 58.9 | 32.14 |
| 35 | −216.254 | 0.15 | | | 32.13 |
| 36 | 52.135 | 7.00 | 1.51633 | 64.1 | 31.80 |
| 37 | −36.253 | 1.80 | 1.83400 | 37.2 | 31.54 |
| 38 | 295.410 | 35.20 | | | 31.22 |
| 39 | 72.117 | 5.88 | 1.48749 | 70.2 | 30.78 |
| 40 | −46.317 | 1.67 | | | 30.54 |
| 41 | −105.708 | 1.80 | 1.83481 | 42.7 | 28.49 |
| 42 | 24.494 | 8.00 | 1.51742 | 52.4 | 27.23 |
| 43 | −49.178 | 0.50 | | | 27.60 |
| 44 | 260.406 | 6.93 | 1.48749 | 70.2 | 27.59 |
| 45 | −36.960 | 1.80 | 1.83400 | 37.2 | 27.44 |
| 46 | −175.060 | 0.18 | | | 27.91 |
| 47 | 27.628 | 4.90 | 1.51633 | 64.1 | 28.32 |
| 48 | 134.571 | 4.50 | | | 27.74 |
| 49 | ∞ | 30.00 | 1.60342 | 38.0 | 40.00 |
| 50 | ∞ | 16.20 | 1.51633 | 64.2 | 40.00 |
| 51 | ∞ | (Variable) | | | 40.00 |
| Image plane | ∞ | | | | |

Aspherical surface data
Nineteenth Surface

K = −3.75315e+002   A4 = 1.78952e−005   A6 = 1.17707e−007
A8 = −7.93453e−010   A10 = −5.97290e−012   A12 = −7.26165e−015
A3 = −1.08113e−005   A5 = −1.57636e−006   A7 = 4.36413e−010
A9 = 7.34620e−011   A11 = 3.34942e−013

Various data
Zoom ratio 20.00

| | Wide angle | Intermediate | Telephoto |
|---|---|---|---|
| Focal length | 8.20 | 41.00 | 164.00 |
| F-number | 1.80 | 1.80 | 2.73 |
| Angle of field | 33.85 | 7.64 | 1.92 |
| Image height | 5.50 | 5.50 | 5.50 |
| Total lens length | 318.58 | 318.58 | 318.58 |
| BF | 9.00 | 9.00 | 9.00 |
| d18 | 0.48 | 38.90 | 51.52 |
| d27 | 54.27 | 10.56 | 6.99 |
| d30 | 4.40 | 9.70 | 0.64 |
| d51 | 9.00 | 9.00 | 9.00 |
| Entrance pupil position | 66.07 | 214.60 | 571.37 |
| Exit pupil position | 419.55 | 419.55 | 419.55 |
| Front principal point | 74.43 | 259.69 | 800.88 |
| Rear principal point | 0.80 | −32.00 | −155.00 |

Zoom lens unit data

| Unit | First surface | Focal length | Lens structure length | Front principal point | Rear principal point |
|---|---|---|---|---|---|
| 1 | 1 | 64.72 | 87.92 | 54.86 | 4.91 |
| 2 | 19 | −13.70 | 22.69 | 2.47 | −12.42 |
| 3 | 28 | −42.20 | 3.80 | −0.09 | −2.17 |
| 4 | 31 | 61.88 | 136.02 | 69.53 | −143.44 |

-continued

Movement amounts of second sub lens unit and third sub lens unit for focusing (Direction toward image side from object side is positive)

| Unit | Infinity | 2.5 m | Minimum distance (0.82 m) |
|---|---|---|---|
| Second sub lens unit | 0 | 2.10 | 6.18 |
| Third sub lens unit | 0 | −1.11 | −3.28 |

Numerical Embodiment 3

Unit mm

Surface data

| Surface Number | r | d | nd | vd | Effective diameter |
|---|---|---|---|---|---|
| 1 | −1367.440 | 5.50 | 1.83400 | 37.2 | 238.33 |
| 2 | 705.066 | 2.00 | | | 229.04 |
| 3 | 616.100 | 17.15 | 1.80518 | 25.4 | 227.18 |
| 4 | −3696.735 | 5.00 | | | 224.81 |
| 5 | −1175.005 | 5.50 | 1.72916 | 54.7 | 223.39 |
| 6 | 3051.897 | 2.00 | | | 217.68 |
| 7 | 1015.687 | 17.04 | 1.59240 | 68.3 | 213.42 |
| 8 | −777.521 | 0.20 | | | 211.14 |
| 9 | 459.281 | 4.50 | 2.00330 | 28.3 | 204.47 |
| 10 | 229.080 | 0.07 | | | 200.37 |
| 11 | 225.458 | 29.45 | 1.43387 | 95.1 | 200.64 |
| 12 | −2697.041 | 41.47 | | | 200.71 |
| 13 | 260.997 | 21.35 | 1.43387 | 95.1 | 200.25 |
| 14 | 1908.125 | 0.20 | | | 199.25 |
| 15 | 227.536 | 19.52 | 1.43387 | 95.1 | 193.17 |
| 16 | 779.445 | 0.20 | | | 191.24 |
| 17 | 229.261 | 15.68 | 1.49700 | 81.5 | 183.05 |
| 18 | 571.406 | (Variable) | | | 180.41 |
| 19 | 268.944 | 2.00 | 1.81600 | 46.6 | 50.77 |
| 20 | 58.663 | 6.78 | | | 45.38 |
| 21 | −167.962 | 1.90 | 1.75500 | 52.3 | 44.54 |
| 22 | 124.304 | 5.43 | | | 43.59 |
| 23 | −87.283 | 1.90 | 1.81600 | 46.6 | 43.68 |
| 24 | 73.008 | 10.05 | 1.92286 | 21.3 | 46.23 |
| 25 | −79.581 | 1.09 | | | 46.90 |
| 26 | −75.798 | 2.20 | 1.88300 | 40.8 | 46.81 |
| 27 | 295.867 | (Variable) | | | 48.52 |
| 28 | 300.546 | 10.26 | 1.59240 | 68.3 | 69.70 |
| 29 | −129.390 | 0.20 | | | 70.68 |
| 30 | 213.995 | 10.66 | 1.48749 | 70.2 | 71.84 |
| 31 | −157.026 | 3.04 | | | 71.78 |
| 32 | −99.893 | 2.50 | 1.72047 | 34.7 | 71.64 |
| 33 | −126.735 | 0.20 | | | 72.31 |
| 34 | 118.088 | 2.50 | 1.84666 | 23.9 | 70.89 |
| 35 | 62.493 | 0.12 | | | 68.32 |
| 36 | 61.014 | 14.10 | 1.49700 | 81.5 | 68.56 |
| 37 | −6767.690 | 0.20 | | | 67.99 |
| 38 | 127.098 | 6.95 | 1.48749 | 70.2 | 66.79 |
| 39 | −9031.175 | (Variable) | | | 65.95 |
| 40 (Stop) | ∞ | 4.50 | | | 30.87 |
| 41 | −76.206 | 1.80 | 1.81600 | 46.6 | 29.24 |
| 42 | 57.329 | 0.20 | | | 28.74 |
| 43 | 37.532 | 5.70 | 1.80809 | 22.8 | 29.06 |
| 44 | 143.612 | 4.97 | | | 28.23 |
| 45 | −56.408 | 2.00 | 1.88300 | 40.8 | 27.53 |
| 46 | 91.618 | 30.04 | 1.80518 | 25.4 | 27.98 |
| 47 | −451.779 | 5.50 | | | 31.18 |
| 48 | −778.121 | 6.39 | 1.62041 | 60.3 | 32.00 |
| 49 | −82.192 | 0.20 | | | 32.52 |
| 50 | −385.987 | 2.10 | 1.83400 | 37.2 | 32.40 |
| 51 | 52.980 | 8.31 | 1.62041 | 60.3 | 32.43 |
| 52 | −48.784 | 0.20 | | | 32.98 |

-continued

| | | | | | |
|---|---|---|---|---|---|
| 53 | 228.661 | 8.78 | 1.48749 | 70.2 | 32.48 |
| 54 | −38.133 | 2.10 | 1.83400 | 37.2 | 31.82 |
| 55 | −104.874 | 0.20 | | | 32.10 |
| 56 | 82.711 | 6.22 | 1.62041 | 60.3 | 31.68 |
| 57 | −1012.775 | 2.00 | | | 30.59 |
| 58 | ∞ | 55.50 | 1.51633 | 64.2 | 30.00 |
| 59 | ∞ | (Variable) | | | 30.00 |
| Image plane | ∞ | | | | |

Various data
Zoom ratio 66.00

| | Wide angle | Intermediate | Telephoto |
|---|---|---|---|
| Focal length | 10.00 | 70.00 | 660.00 |
| F-number | 1.80 | 1.79 | 3.30 |
| Angle of field | 28.81 | 4.49 | 0.48 |
| Image height | 5.50 | 5.50 | 5.50 |
| Total lens length | 676.36 | 676.36 | 676.36 |
| BF | 9.60 | 9.60 | 9.60 |
| d18 | 2.01 | 118.64 | 159.56 |
| d27 | 245.65 | 105.11 | 3.29 |
| d39 | 3.50 | 27.41 | 88.32 |
| d59 | 9.60 | 9.60 | 9.60 |
| Entrance pupil position | 195.11 | 855.11 | 7320.99 |
| Exit pupil position | 973.75 | 973.75 | 973.75 |
| Front principal point | 205.21 | 930.19 | 8432.80 |
| Rear principal point | −0.40 | −60.40 | −650.40 |

Zoom lens unit data

| Unit | First surface | Focal length | Lens structure length | Front principal point | Rear principal point |
|---|---|---|---|---|---|
| 1 | 1 | 237.11 | 186.82 | 108.79 | −27.42 |
| 2 | 19 | −27.50 | 31.34 | 8.57 | −12.73 |
| 3 | 28 | 67.50 | 50.73 | 13.98 | −22.12 |
| 4 | 40 | 53.53 | 146.71 | 56.67 | 5.49 |

Movement amounts of second sub lens unit and third sub lens unit for focusing (Direction toward image side from object side is positive)

| Unit | Infinity | 7.0 m | Minimum distance (3.5 m) |
|---|---|---|---|
| Second sub lens unit | 0 | 13.72 | 26.92 |
| Third sub lens unit | 0 | −6.90 | −13.55 |

Numerical Embodiment 4

Unit mm

Surface data

| Surface Number | r | d | nd | vd | Effective diameter |
|---|---|---|---|---|---|
| 1 | −1768.653 | 4.00 | 1.72916 | 54.7 | 145.32 |
| 2 | 200.355 | 1.00 | | | 137.20 |
| 3 | 197.192 | 9.91 | 1.84666 | 23.8 | 136.88 |
| 4 | 438.805 | 8.71 | | | 135.48 |
| 5 | −782.602 | 4.00 | 1.69680 | 55.5 | 135.14 |
| 6 | 476.091 | 3.24 | | | 131.86 |
| 7 | 927.727 | 13.43 | 1.62041 | 60.3 | 131.57 |
| 8 | −272.528 | 0.18 | | | 130.85 |
| 9 | 297.793 | 3.50 | 1.80518 | 25.4 | 120.27 |
| 10 | 127.627 | 0.20 | | | 116.22 |
| 11 | 128.536 | 17.16 | 1.49700 | 81.5 | 116.23 |
| 12 | −7347.511 | 26.37 | | | 115.56 |
| 13 | 183.761 | 8.18 | 1.43387 | 95.1 | 104.62 |
| 14 | 562.632 | 3.27 | | | 103.51 |
| 15 | −2281.275 | 3.30 | 1.72047 | 34.7 | 103.37 |
| 16 | 967.845 | 0.20 | | | 102.09 |
| 17 | 182.530 | 9.96 | 1.59522 | 67.7 | 101.68 |
| 18 | 5067.572 | 0.20 | | | 101.06 |
| 19 | 173.197 | 8.83 | 1.59522 | 67.7 | 98.78 |
| 20 | 901.442 | (Variable) | | | 97.53 |
| 21* | 165.452 | 2.00 | 1.77250 | 49.6 | 57.97 |
| 22 | 37.484 | 14.04 | | | 49.57 |
| 23 | −75.989 | 1.78 | 1.59240 | 68.3 | 49.32 |
| 24 | 108.454 | 0.20 | | | 49.31 |
| 25 | 73.810 | 8.74 | 1.75520 | 27.5 | 49.78 |
| 26 | −276.608 | (Variable) | | | 49.27 |
| 27 | −279.465 | 4.93 | 1.73800 | 32.3 | 41.01 |
| 28 | −79.517 | 1.62 | | | 40.48 |
| 29 | −56.412 | 1.78 | 1.77250 | 49.6 | 40.04 |
| 30* | −2642.236 | (Variable) | | | 39.80 |
| 31 | −66.467 | 1.78 | 1.80400 | 46.6 | 37.98 |
| 32 | 187.556 | 4.41 | 1.92286 | 18.9 | 40.21 |
| 33 | −782.376 | (Variable) | | | 41.30 |
| 34 (Stop) | ∞ | 2.22 | | | 42.69 |
| 35 | 602.289 | 5.57 | 1.62041 | 60.3 | 44.42 |
| 36 | −82.450 | 0.22 | | | 45.15 |
| 37 | 272.024 | 7.14 | 1.62041 | 60.3 | 46.17 |
| 38 | −126.138 | 0.22 | | | 46.49 |
| 39 | 116.914 | 8.84 | 1.43875 | 94.9 | 45.99 |
| 40 | −75.619 | 2.22 | 1.84666 | 23.8 | 45.39 |
| 41 | −440.270 | 0.22 | | | 45.35 |
| 42 | 41.280 | 7.66 | 1.59240 | 68.3 | 44.59 |
| 43 | 208.257 | 32.07 | | | 43.41 |
| 44 | −125.932 | 1.33 | 2.00330 | 28.3 | 27.58 |
| 45 | 30.988 | 2.38 | | | 27.15 |
| 46 | 59.354 | 5.67 | 1.92286 | 18.9 | 28.15 |
| 47 | 758.351 | 13.92 | | | 29.06 |
| 48 | −24.749 | 2.77 | 1.88300 | 40.8 | 32.68 |
| 49 | −33.641 | 0.22 | | | 36.34 |
| 50 | 238.064 | 6.79 | 1.59240 | 68.3 | 41.51 |
| 51 | −60.008 | 4.01 | | | 42.33 |
| 52 | 100.755 | 7.62 | 1.48749 | 70.2 | 44.44 |
| 53 | −96.660 | (Variable) | | | 44.40 |
| Image plane | ∞ | | | | |

Aspherical surface data

Twenty-first surface $\kappa = 2.15920\text{e}+001$  $A4 = -3.81583\text{e}-007$  $A6 = -9.77038\text{e}-011$
$A8 = -1.57108\text{e}-012$  $A10 = 9.73495\text{e}-016$  $A12 = -9.77886\text{e}-019$
$A3 = -7.46493\text{e}-007$  $A5 = -1.14152\text{e}-008$  $A7 = 2.66135\text{e}-011$
$A9 = -4.88691\text{e}-015$  $A11 = 1.72228\text{e}-017$ Thirtieth surface $\kappa = -2.12127\text{e}+004$  $A4 = -1.66067\text{e}-007$  $A6 = 9.63198\text{e}-010$
$A8 = 1.15647\text{e}-012$  $A10 = 1.54902\text{e}-015$  $A12 = -2.67831\text{e}-018$
$A3 = -1.03485\text{e}-006$  $A5 = -2.96554\text{e}-008$  $A7 = 1.12857\text{e}-011$
$A9 = -1.56984\text{e}-013$  $A11 = 1.32849\text{e}-016$ Various data
Zoom ratio 7.50

| | Wide angle | Intermediate | Telephoto |
|---|---|---|---|
| Focal length | 34.00 | 102.20 | 255.00 |
| F-number | 2.70 | 2.70 | 2.70 |
| Angle of field | 24.58 | 8.65 | 3.49 |
| Image height | 15.55 | 15.55 | 15.55 |
| Total lens length | 432.02 | 432.02 | 432.02 |
| BF | 48.98 | 48.98 | 48.98 |
| d20 | 0.46 | 65.27 | 97.03 |
| d26 | 19.41 | 7.72 | 1.99 |
| d30 | 83.16 | 21.94 | 4.17 |
| d33 | 2.00 | 10.09 | 1.83 |
| d53 | 48.98 | 48.98 | 48.98 |

-continued

| | | | |
|---|---|---|---|
| Entrance pupil position | 137.20 | 326.48 | 570.75 |
| Exit pupil position | −610.85 | −610.85 | −610.85 |
| Front principal point | 169.45 | 412.86 | 727.20 |
| Rear principal point | 14.98 | −53.22 | −206.01 |

Zoom lens unit data

| Unit | First surface | Focal length | Lens structure length | Front principal point | Rear principal point |
|---|---|---|---|---|---|
| 1 | 1 | 158.50 | 125.64 | 86.69 | 1.50 |
| 2 | 21 | −64.00 | 26.75 | −0.03 | −22.32 |
| 3 | 27 | −150.19 | 8.33 | 4.90 | −0.53 |
| 4 | 31 | −97.68 | 6.18 | −0.44 | −3.72 |
| 5 | 34 | 87.38 | 111.11 | 72.44 | −187.20 |

Movement amounts of second sub lens unit and third sub lens unit for focusing (Direction toward image side from object side is positive)

| Unit | Infinity | 7.0 m | Minimum distance (1.5 m) |
|---|---|---|---|
| Second sub lens unit | 0 | 3.87 | 16.90 |
| Third sub lens unit | 0 | −1.95 | −8.52 |

TABLE 1

| | | Numerical Embodiment | | | |
|---|---|---|---|---|---|
| | Expression | 1 | 2 | 3 | 4 |
| (1) | f1/f2 | −7.00 | −4.72 | −8.62 | −2.48 |
| (2) | Ok/D | −0.07 | 0.06 | −0.15 | 0.01 |
| (3) | \|β13/β12\| | 0.0005 | 0.0745 | 0.0037 | 0.0146 |
| (4) | \|f11/f1\| | 2.38 | 1.77 | 3.73 | 1.54 |
| (5) | \|δ12/δ13\| | 0.68 | 1.88 | 1.99 | 1.99 |
| (6) | f12/f1 | 2.44 | 3.28 | 3.41 | 1.93 |
| (7) | f13/f1 | 1.07 | 1.04 | 1.04 | 1.00 |
| (8) | \|(R11 + R12)/(R11 − R12)\| | 0.13 | 0.67 | 0.32 | 0.80 |
| (9) | N12n − N12p | 0.33 | 0.26 | 0.49 | 0.25 |
| (10) | ν12p − ν12n | 57.60 | 49.20 | 53.40 | 45.50 |
| (11) | \|δ13 × f1/f13/IS\| | 0.59 | 0.29 | 1.18 | 0.27 |
| | β12 | −30.393 | 2.750 | −8.5672 | 6.6606 |
| | β13 | 0.014 | −0.205 | 0.0313 | −0.0972 |
| | f11 | −333.36 | −114.81 | −883.54 | −244.74 |
| | f12 | 341.43 | 212.34 | 807.93 | 305.43 |
| | f13 | 149.80 | 67.13 | 247.36 | 157.89 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-115344, filed May 24, 2011, which is hereby incorporated by reference herein in its entirety.

What is claimed is:

1. A zoom lens comprising, in order from an object side to an image side:
a first lens unit having positive refractive power that does not move for zooming;
a second lens unit having negative refractive power that moves during zooming;
a zoom lens unit including at least one lens unit that moves during zooming;
a stop; and
a fixed lens unit that does not move for zooming,
wherein the first lens unit includes, in order from the object side to the image side:
a first sub lens unit having negative refractive power that does not move for focusing;
a second sub lens unit having positive refractive power that moves toward the image side during focusing from an object at infinity to an object at a close range; and
a third sub lens unit having positive refractive power that moves toward the object side during focusing from an object at infinity to an object at a close range, and
wherein the following expressions are satisfied:

$$-15.0 < f1/f2 < -2.0,$$

$$-0.25 < Ok/D < 0.15, \text{ and}$$

$$|\beta13/\beta12| < 0.1,$$

where f1 represents a focal length of the first lens unit, f2 represents a focal length of the second lens unit, Ok represents a distance from a vertex of a surface closest to the image side in the first lens unit to an image side principal point position of the first lens unit in a state in which an object at infinity is focused, a direction from the object side to the image side being regarded as positive, D represents a thickness of the first lens unit on an optical axis in the state in which an object at infinity is focused, and β12 and β13 respectively represent lateral magnifications of the second sub lens unit and the third sub lens unit in the state in which an object at infinity is focused.

2. A zoom lens according to claim 1, wherein the following expression is satisfied:

$$1.5 < |f11/f1| < 5.0,$$

where f11 represents a focal length of the first sub lens unit.

3. A zoom lens according to claim 1, wherein the following expression is satisfied:

$$0.5 < |\delta12/\delta13| < 2.5,$$

where δ12 and δ13 represent movement amounts of the second sub lens unit and the third sub lens unit when focusing from an object at infinity to an object at a minimum object distance, respectively.

4. A zoom lens according to claim 1, wherein the following expressions are satisfied:

$$1.0 < f12/f1 < 4.0, \text{ and}$$

$$0.8 < f13/f1 < 1.3,$$

where f12 represents a focal length of the second sub lens unit, and f13 represents a focal length of the third sub lens unit.

5. A zoom lens according to claim 1, wherein the first sub lens unit includes one or more negative lenses and one positive lens, and comprises, in order from the object side to the image side, one of the one or more negative lenses and the positive lens.

6. A zoom lens according to claim 5, wherein the following expression is satisfied:

$$|(R11+R12)/(R11-R12)| < 1.0,$$

where R11 represents a curvature radius of an object-side surface of a negative lens closest to the object side, and R12 represents a curvature radius of an image-side surface of the negative lens.

7. A zoom lens according to claim 1, wherein:
the second sub lens unit comprises two or more positive lenses and one or more negative lenses, and
the following expressions are satisfied:

$$0.15 < N12n - N12p < 0.60, \text{ and}$$

$$30 < \nu12p - \nu12n < 70,$$

where $N12p$ and $\nu12p$ respectively represent an average refractive index and an average Abbe number of the positive lenses constituting the second sub lens unit, and $N12n$ and $\nu12n$ respectively represent an average refractive index and an average Abbe number of negative lenses constituting the second sub lens unit.

8. An image pickup apparatus comprising:
a zoom lens including, in order from an object side to an image side:
  a first lens unit having positive refractive power that does not move for zooming;
  a second lens unit having negative refractive power that moves during zooming;
  a zoom lens unit including at least one lens unit that moves during zooming;
  a stop; and
  a fixed lens unit that does not move for zooming,
  wherein the first lens unit includes, in order from the object side to the image side:
    a first sub lens unit having negative refractive power that does not move for focusing;
    a second sub lens unit having positive refractive power that moves toward the image side during focusing from an object at infinity to an object at a close range; and
    a third sub lens unit having positive refractive power that moves toward the object side during focusing from an object at infinity to an object at a close range, and
  wherein the following expressions are satisfied:

$$-15.0 < f1/f2 < -2.0,$$

$$-0.25 < Ok/D < 0.15, \text{ and}$$

$$|\beta13/\beta12| < 0.1,$$

where f1 represents a focal length of the first lens unit, f2 represents a focal length of the second lens unit, Ok represents a distance from a vertex of a surface closest to the image side in the first lens unit to an image side principal point position of the first lens unit in a state in which an object at infinity is focused, a direction from the object side to the image side being regarded as positive, D represents a thickness of the first lens unit on an optical axis in the state in which an object at infinity is focused, and $\beta12$ and $\beta13$ respectively represent lateral magnifications of the second sub lens unit and the third sub lens unit in the state in which an object at infinity is focused; and
a solid-state image pickup element for receiving light of an image formed by the zoom lens.

9. An image pickup apparatus according to claim 8, wherein the following expression is satisfied:

$$0.16 < |\delta13 \times f1/f13/IS| < 1.80,$$

where IS represents an image size of the image pickup apparatus.

* * * * *